United States Patent
Randell

(10) Patent No.: US 7,232,628 B2
(45) Date of Patent: Jun. 19, 2007

(54) OPTIMISED ALKALINE ELECTROCHEMICAL CELLS

(75) Inventor: Christopher F. Randell, Durham (GB)

(73) Assignee: Eveready Battery Company, Inc., St. Louis, MO (US)

( * ) Notice: Subject to any disclaimer, the term of this patent is extended or adjusted under 35 U.S.C. 154(b) by 427 days.

(21) Appl. No.: 10/480,084

(22) PCT Filed: Jun. 7, 2002

(86) PCT No.: PCT/US02/18143

§ 371 (c)(1),
(2), (4) Date: Dec. 8, 2003

(87) PCT Pub. No.: WO02/101858

PCT Pub. Date: Dec. 19, 2002

(65) Prior Publication Data

US 2004/0197655 A1    Oct. 7, 2004

(30) Foreign Application Priority Data

| Jun. 8, 2001 | (GB) | ................. 0113990.6 |
| Jun. 8, 2001 | (GB) | ................. 0113991.4 |
| Aug. 28, 2001 | (GB) | ................. 0120824.8 |

(51) Int. Cl.
    H01M 4/50    (2006.01)
    H01M 10/26   (2006.01)
    H01M 4/42    (2006.01)
    H01M 4/62    (2006.01)

(52) U.S. Cl. ................... 429/224; 429/206; 429/229; 429/232

(58) Field of Classification Search ................ 429/206, 429/224, 229, 232, 204
See application file for complete search history.

(56) References Cited

U.S. PATENT DOCUMENTS

| 5,283,139 A | 2/1994 | Newman et al. ............ 429/224 |
| 5,489,483 A | 2/1996 | Soma et al. ................. 429/27 |
| 6,022,639 A | 2/2000 | Urry ........................... 429/229 |
| 6,207,322 B1 | 3/2001 | Kelsey et al. ............... 429/206 |
| 6,294,287 B1 * | 9/2001 | Lee et al. ................... 429/120 |
| 2003/0049531 A1 | 3/2003 | Qu ............................. 429/224 |

FOREIGN PATENT DOCUMENTS

| EP | 0484605 | 5/1992 |
| GB | 1493786 | 11/1977 |
| JP | 56079854 | 6/1981 |
| JP | 57053067 | 3/1982 |
| JP | 57121160 | 7/1982 |
| JP | 09115522 A * | 6/1997 |
| WO | 98/50969 | 11/1998 |
| WO | 99/34460 | 7/1999 |
| WO | 00/30193 | 5/2000 |
| WO | 01/99214 | 12/2001 |

* cited by examiner

*Primary Examiner*—Gregg Cantelmo
(74) *Attorney, Agent, or Firm*—Russell H. Toye, Jr.

(57) ABSTRACT

Alkaline electrochemical cells with substantially increased performance characteristics have a porous anode, with a porosity equal to or greater than 69%, and a porous cathode, comprising manganese dioxide and having a porosity equal to or greater than 26%.

24 Claims, 4 Drawing Sheets

OPTIMISED ALKALINE ELECTROCHEMICAL CELLS

BACKGROUND OF THE INVENTION

The present invention relates to alkaline electrochemical cells having porous cathodes comprising manganese dioxide.

Alkaline electrochemical cells have been commercially available for well over twenty years. In many modern applications, alkaline cells vastly outperform traditional zinc carbon cells, and are the batteries of choice for most consumers.

The competition to produce the best alkaline battery continues to be fierce, but a large number of restrictions exist, not least of which is the size of any given cell.

Conventional sizes for primary alkaline batteries include AAA, AA, C, D and 9V (LR03, LR6, LR14, LR20 and 6LR61, respectively), and standard dimensions are laid down for all of these types. Thus, whichever battery is chosen must fit within a given volume, thereby limiting the maximum amount of ingredients which it is possible to put into any given cell.

Working against these constraints, battery manufacturers have, for example, substantially reduced the thickness of the cell walls, reduced the thickness of the seals, and changed the nature of the labelling of the cell, all in order to optimise the use of the internal volume of the cell.

When it becomes impractical to further increase the volume of the cell ingredients, battery manufacturers then have the problem of trying to further enhance performance and battery life through enhancing and/or changing the ingredients used, but there must, ultimately, be a limit.

Another approach to improving battery discharge performance has been to increase the efficiency of active material utilisation during discharge. This is most effective for batteries intended for use under conditions where the discharge efficiency is low (e.g., in devices where the resistive load is low, the current drain is high, or the power consumption is high). This has become increasingly important as battery powered devices tend to place increasingly greater demands on the batteries.

In U.S. Pat. No. 5,283,139 ('139 or US '139 hereafter), there is disclosed a cell in which increased performance is achieved by increasing the density of both the anode and the cathode, without increasing the amount of aqueous, potassium hydroxide electrolyte. If the volume of a given active ingredient cannot be increased, then increasing its density is a logical, straightforward means for increasing the discharge capacity of the cell.

Nevertheless, there remains a desire to provide better and better electrochemical cells.

In International Patent Publication No. WO 01/99214, we demonstrate that, surprisingly, and contrary to expectations, substantial enhancement of cells, above and beyond those prepared in accordance with US '139, is possible, with performances being increased by as much as 15%, or more, by optimising the water ratios, in contrast to US '139.

Prior to '139, U.S. Pat. No. 5,489,493 disclosed alkaline electrochemical cells comprising a cathode comprising manganese dioxide, in which the cathode is composed of a mixture of a minor amount of highly porous manganese dioxide and a major amount of low porosity manganese dioxide. The highly porous manganese dioxide is exemplified as chemical manganese dioxide (CMD) and is distributed throughout the cathode in order to provide ion diffusion paths through the cathode. However, the use of CMD is not desirable in all cases, since CMD has both a lower peroxidation and a lower density than electrolytic manganese dioxide (EMD). Consequently, CMD has a lower theoretical capacity than EMD on a volumetric basis.

In WO 00/30193, there is disclosed the possibility of using a semi-solid cathode material. This semi-solid material has a high porosity and high electrolyte content, and primarily serves to reduce cathode polarisation effects. The drawbacks to this construction include the fact that there is a substantially reduced capacity in the cell and that the $MnO_2$:C ratio is very low but, more importantly, that this cathode material becomes very difficult to handle, so that it is impractical to make a cell containing such material using conventional manufacturing processes and equipment. The capacity and performance of such cells is also severely compromised by comparison with US '139.

WO 98/50969 discloses the use of uniform zinc particles in the anode, which increases performances for anodes having porosities of up to and beyond 80%. Such porosities tend to separate zinc particles and increase impedance, especially in a 1-meter drop test. This disclosure teaches that increased porosities increase performance, provided that there is flaked zinc. High porosities are easily achievable, even at relatively high densities, as zinc is extremely dense, and no upper limit is indicated, although experimental data show good results between 75 and 80% porosity.

Battery industry standards traditionally used constant resistance tests to define battery performance levels for common types of applications. With changes in battery powered devices, together with the availability of more sophisticated testing equipment, there has been a trend to include constant current and, more recently, even constant power tests. There is now an increased importance on achieving improved battery performance on not only heavier loads, but on heavier loads to higher voltage endpoints under both constant current and constant power types of discharge. These trends have also contributed to an increasing need for batteries that perform well in niche areas, such as heavy load, constant current (Amps), constant power (Watts), continuous, and intermittent discharge, and combinations thereof.

Raising battery voltage on discharge can improve the discharge capacity on heavy drain discharge, particularly to higher voltage endpoints. In alkaline batteries, the use of voltage boosting agents such as $Ag_2O$ and ferrates is theoretically attractive, but cost, handling, and instability can be problems. Therefore, lowering the internal resistance is the only practical way to increase the operating voltage of the battery. Efforts to increase the electrical conductivity of the anode and cathode as a means of improving discharge performance at high constant wattage have met with little or no success, as the necessary changes in other parameters has counteracted the improvements.

It is well known that dry cell batteries were originally made with mercury, but concern about potential damage to the environment caused by the disposal of large amounts of mercury-containing batteries was substantial. Thus, the amount of mercury contained in dry cell batteries has now been reduced to the extent that, in most consumer batteries on the market, there is no added mercury. There may be traces of mercury present in the zinc, but levels are measured in parts per million.

Reducing the amount of mercury was no easy feat as, apart from anything else, it served to prevent gassing. Removal has proven possible by reducing gassing in other ways, such as improving the purity of the various electrode and electrolyte constituents and by adding various additives, such as substituted ammonium derivatives.

With the elimination of mercury, increasing the levels of zinc also proved necessary, because mercury also contributed to the conductivity of the anode. Removing mercury made the anodic zinc electronically inefficient, and the quantity of zinc had to be increased. To maintain the electrical conductivity at a sufficiently high level throughout discharge, an excess of zinc is generally required. A ratio of zinc capacity to cathode capacity of about 1.33:1 is common. However, the function of the excess zinc is that of a conductor, not an active material, so it limits the amounts of active material that can be put into the battery. An additional disadvantage is that any zinc left after the cell has been exhausted can react with any remaining water to create hydrogen.

The 1.33:1 anode:cathode ratio is common, at least partially, because of the second electron reaction, where $Mn^{III} \rightarrow Mn^{II}$. This reaction is secondary to the primary reaction in which $Mn^{IV} \rightarrow Mn^{III}$, but has been considered significant in the total discharge capacity of cells, to date. The second electron reaction takes place in solution at appropriate centres, which tend to be the graphite used for creating conductivity in the cathode. Graphite is not an active material, so the quantity used is generally reduced as far as possible, with a ratio of at least 20:1 active manganese dioxide:graphite being common. Greater ratios of active manganese dioxide:graphite are constantly being sought, in order to maximise the active material, while maintaining conductivity.

However, reducing the quantity of graphite reduces the active centres for conducting the second reaction, so that the second electron reaction becomes inefficient. Accordingly, less of the zinc is consumed, leaving some to gas after cell failure. This effect leads to leakage following deep discharge. Because reducing zinc levels to compensate leads to lower cell discharge capacity, a better option is to ensure that cells will not vent or leak as a result of the typical internal pressures that build up under non-abuse situations.

BRIEF SUMMARY OF THE INVENTION

Surprisingly, what we have discovered is that the porosity of both the cathode and the anode is not only important, but that there is a maximum, and easily attainable, porosity of each, beyond which there is little or no advantage to be gained, and that combining the two yields cells which can provide even better performance than is available from following the teaching of US '139, despite actually reducing quantities of active materials in order to achieve the higher porosities.

Thus, the present invention provides an electrochemical cell comprising an aqueous alkaline electrolyte, a porous cathode, and a porous anode, wherein the cathode comprises manganese dioxide, the cathode porosity is equal to or greater than 26%, the anode comprises an electrochemically active material insoluble in the electrolyte, and the anode porosity is equal to or greater than 69%.

The term "porosity", as used herein, relates to the volumetric amount of non-solids in the electrode in question. Solids are those components that are insoluble under conditions pertaining in the assembled cell. In the anode, the solids will generally only comprise zinc and indium hydroxide, where present. The other anode components are usually soluble in the electrolyte solution, including gellants. Components which are soluble in the electrolyte need not be considered as solids when calculating porosity. Where a portion of an ingredient is insoluble, such as where the electrolyte is saturated, it is not necessary to include the insoluble portion as a solid when calculating the electrode porosity; the entire amount of that ingredient is excluded. In any event, the amount of gellant in the anode is generally so small that, to most intents and purposes, it can be discounted when calculating porosity. In the cathode, the solids will generally effectively comprise only the $MnO_2$ and carbon (conventionally graphite). For practical considerations, although cathode binders are usually insoluble and, therefore, count as solids, the amount of any binder is generally so small that it has no significant effect on the calculated porosity. Because the cathode and anode both contain insoluble active materials ($MnO_2$ and preferably zinc, respectively), a porosity of 100% is not possible for either the anode or the cathode in an electrochemical cell of the invention.

The present invention will be further illustrated by reference to the accompanying drawings, in which:

DETAILED DESCRIPTION OF THE INVENTION

Figure 1:
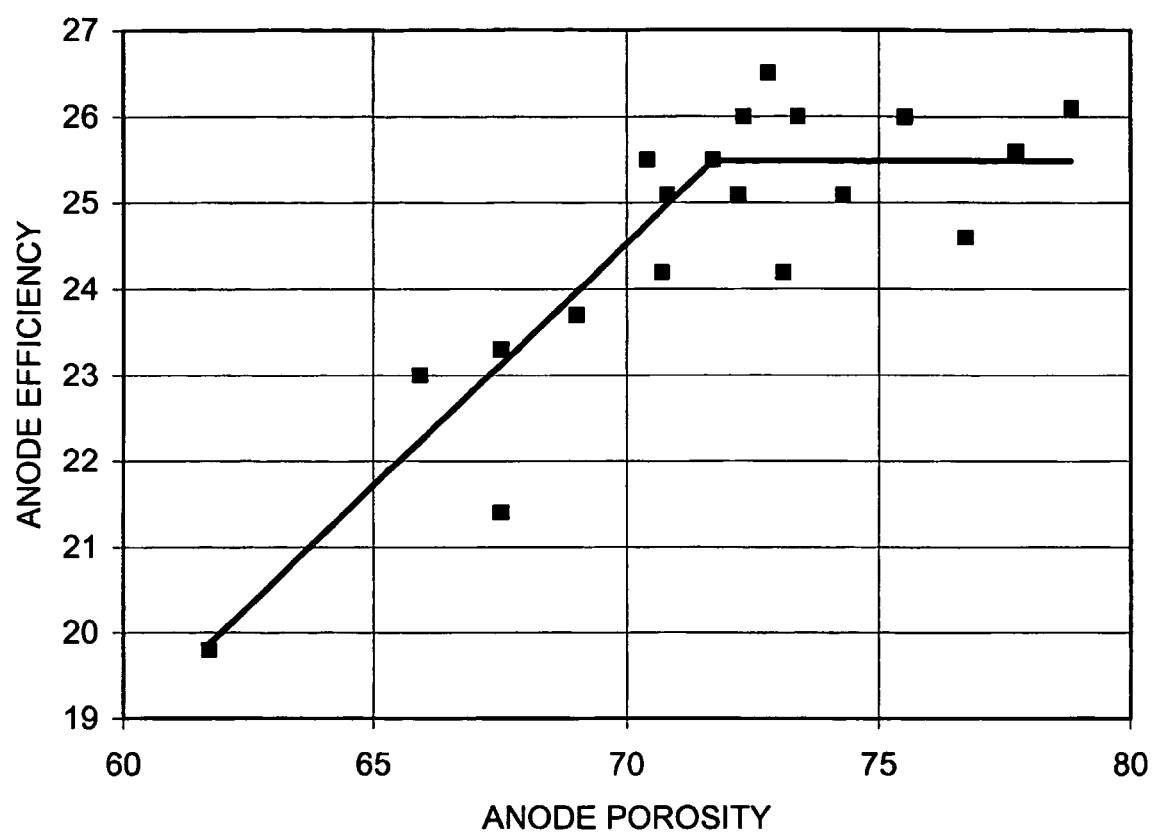
FIG. 1 is a graph showing anode porosity vs. anode efficiency for cells made according to an embodiment of the invention.

Cells made according to the present invention have both a highly porous cathode and a highly porous anode. Although enhanced performance characteristics are readily observable with increasing porosity of either electrode, there is little improvement unless both porosities are at least at the minimum level of the present invention. At these levels, there is immediate and rapid improvement of the performance of the cell, with both electrode discharge efficiency and duration dramatically increasing. It will be appreciated that, with increasing porosity of either electrode, the capacity of that electrode will necessarily drop, assuming constant volume of the electrode. However, above the minimum levels of the invention, the loss in capacity is more than compensated by the increase in performance of the cell for a short range. The increase in porosity appears to improve the efficiency of the relevant electrode, and the combination of the improvements in both electrodes seems to allow the electrochemical cell reaction to proceed more freely, thereby more than compensating for loss in electrode capacity. Increasing the electrical conductivity of electrodes is known as a way to improve high rate discharge performance, but if the electrode porosities are below the levels of the invention, the beneficial effects of increasing electrode conductivity is not seen, or is masked.

Accordingly, cells made according to the present invention have a cathode porosity of at least 26% and an anode porosity of at least 69%.

When the porosity of both the cathode and anode are at optimum efficiency levels, factors affecting internal conductivity have a disproportionately beneficial effect on cell performance on constant power (wattage) discharge, particularly on high power discharge, if the zinc is properly selected to maintain sufficient electrical conductivity in the anode. The particles of zinc in the anode must have sizes and shapes that allow the zinc to form an electrically conductive matrix even though the amount of zinc relative to the anode volume is relatively small. Otherwise, the zinc particles become separated, interrupting the conductive matrix within the anode. When zinc particles have such shapes and sizes, the zinc has a relatively low tap density.

Thus, an embodiment of the present invention provides an alkaline electrochemical cell having a manganese dioxide based cathode and a zinc based anode, the cathode having a porosity equal to or greater than 27%, the anode having a porosity equal to or greater than 69%, and the zinc of the anode consisting of zinc having a calculated overall tap density of less than 3.2 g/cc.

By "manganese dioxide based" and "zinc based" is meant that manganese dioxide and zinc are the primary active electrode materials in the cathode and anode, respectively.

Further improvement can be achieved by making further increases in porosity of one or both of the anode and cathode, and cells in which the anode porosity is at least 70% and the cathode porosity is at least 28 percent are preferred.

While a highly porous anode and a highly porous cathode are advantageous, there appears to be little or no additional improvement to be gained by increasing anode porosity beyond 76%. There is no need to increase anode porosity any further, thereby limiting any problems associated with effecting such increase, such as reducing amounts of materials and, concomitantly, capacity. The effect is not so marked with the cathode but, again, there is increasingly little, if anything, in terms of overall performance to be gained by increasing cathode porosity beyond 36%.

The point above which little or no added benefit can be seen will depend on the overall characteristics of the cell. However, in general, this point appears to be around 71% to 74% for the anode. Above about 71% the effects of reduced anode capacity become more important, and there is a plateauing and subsequent gradual drop in performance as the anode porosity is increased further.

Anode porosity is generally substantially independent of the intended use of the cell. However, discharge performance is affected more by cathode porosity, so the preferred cathode porosity will also depend to some extent on the intended use of the cell. In general, high rate discharge performance is better when the cathode porosity is at least 30% and even better when the cathode is at least 31% porous. Preferably the cathode porosity is no more than 34%.

Cells of the invention with porosities generally above those indicated as preferred are also included herein as, although such cells have only similar, or even lower, performance than cells of the art, they still provide performance recognised as being useful, while containing significantly reduced quantities of active ingredients, thus being of benefit in reducing manufacturing costs.

As used herein, electrode capacity is the theoretical capacity of the electrode in ampere hours (Ah). Unless otherwise indicated or apparent, the specific capacity values used herein are, for manganese dioxide, 0.285 Ah/g for a 1 electron discharge, and, for zinc, 0.820 Ah/g.

As a guide, it is preferred that the ratio of cathode capacity:cell volume for cells of the present invention is in the range of 0.42 to 0.49 Ah/cm$^3$, when cathode capacity is calculated in accordance with the 1 electron principle described hereinbelow. In contrast, when using the principle assumed in US '139, then this ratio is approximately 0.54 to 0.63 Ah/cm$^3$.

In a preferred embodiment, then, there is provided a cell of the invention wherein the ratio of cathode capacity:cell volume is in the range of 0.42 to 0.49 Ah/cm$^3$, when cathode capacity is calculated in accordance with the 1 electron principle.

Thus, in the context of an AA, or LR6, cell, the advantages of the present invention are particularly observed when the capacity of the cathode is equal to or greater than 2.6 Ah. Below this point, performance tends only to be equivalent to that of the art, although advantages may be observed in reduced quantities of active ingredients. At or above 2.9 Ah, the combination of increased porosity of the electrodes acts synergistically with increased capacity and decreased A:C ratio to provide cells which not only have excellent performance in continuous high drain constant current situations, but which also have excellent performance on lower drain intermittent tests.

Accordingly, in a preferred embodiment, there is provided an LR6 cell of the invention which has a cathode capacity of at least 2.6 Ah.

Also in relation to LR6 cells, the effects of the present invention are available up to a capacity of about 3.2 Ah. Above this level, the increasing density requirements drive available space down too far, and advantages start to be lost. However, it becomes substantially difficult to exceed a cathode capacity above 2.9 Ah. In general, the range of 2.6 to 3.0 Ah provides very significantly enhanced LR6 cell performance in high drain applications, and is particularly preferred.

Cells of the present invention are of particular use in high drain applications, such as in PDA's (personal digital assistants) and other devices requiring continuous discharge, or frequent discharge, as well as in digital cameras, video cameras and photoflash devices. They are especially preferred for devices that discharge the cells in a nearly constant power mode, such as MP3 players, for example. For low drain applications, cells of the invention still provide an advantage, although the reduction in capacity with increasing porosity has greater significance, so that this must be factored in accordingly when providing cells for such applications.

As noted above, the intended end-use of the cell has an impact on the choice of cell parameters. For example, if the cell is intended for use in a continuous discharge constant power drain situation, it is desirable to have a cathode porosity in excess of 30%, preferably between 30 and 36%, with 32 to 34% being more preferred, especially about 33%. Any anode porosity of at least 69%, such as 71% as mentioned above, is useful. For LR6 (AA) cells, the capacity of the cathode is preferably between about 2.7 and 2.9 Ah, inclusive, in such continuous power drain applications, and EMD:C is, independently, preferably between 20:1 and 25:1.

As expected, for intermittent constant power discharge situations, the capacity of the cell becomes a more significant factor, so that the balance between cathode porosity and capacity swings back. The porosity of the cathode is preferably between about 28 and 30%, inclusive, and the capacity of the cathode is preferably between 2.9 and 3.0 Ah, inclusive, for an AA or LR6 cell. EMD:C is, independently, preferably between 20:1 and 23:1. Indeed, this embodiment provides excellent results in most if not all wattage tests currently used, and forms a particularly preferred embodiment of the present invention. In accordance with the principles enumerated above, it will be appreciated that this embodiment extends to all cell types, as do all other embodiments described herein, unless otherwise apparent.

It is particularly preferred that, at a depth of discharge of one electron, i.e. after the cell has discharged to a level of 1 electron as described below, any cell has a calculated KOH concentration of about 50% w/w. Above 50%, KOH crystallises out rapidly, reducing both alkalinity and water levels, as each molecule of KOH takes two molecules of water of crystallisation. Cells having a calculated final concentration of KOH much above 50%, therefore, fail quickly.

Cells having a calculated final concentration of KOH much below 50% will generally be inefficient, with water taking up room better taken up by active ingredients. In addition, if KOH is too dilute, then the inefficiency can be further compounded, as detailed below. With the porosities of the present invention, however, and using electrolyte concentrations used in the art, final KOH concentrations can fall below 50% without necessarily wasting space. Such cells, whilst generally being encompassed by the present invention, have been found to be not operating at maximum efficiency, despite the electrolyte only taking space that cannot be used by the active ingredients, optimal efficiency only occurring when the final KOH concentration is calculated to be ~50%.

What we have found is that, for cells where maximal efficient anode porosity has been reached, final KOH concentrations of less than 50% lead to a voltage drop, so that cells "fail" earlier. In other words, in a continuous test, for example, cells reach the deemed failure point of 1 V sooner than cells with a 1 electron final KOH concentration of 50%. In fact, it has also been noted that cells with a final KOH of less than 50% also exhibit earlier zinc passivation.

In cells having anode porosities lower than those of the present invention, increased KOH concentration, both to start and at calculated 1 electron discharge, leads to improved performance. However, the performance never exceeds that of the present invention and, because the porosities are lower, the amount of active material is necessarily greater. The porosities of the present invention, therefore, allow the use of significantly smaller amounts of active material but provide enhanced performance characteristics.

Without being bound by theory, it is believed that the increased KOH concentration at lower anode porosities serves to drive the reaction scheme (I), shown below, forward where, otherwise, the reduced porosity serves to hinder the reaction by restricting ionic movement. With the porosities of the present invention, however, there is no significant hindrance and, once an anode porosity of about 70% or 71% is achieved, the cell reaction becomes cathode limited.

During the cell reaction, when current is flowing, the concentration of KOH rises appreciably in the cathode, while falling in the anode. If the anode porosity is too low, then the ion exchange necessary to compensate this effect does not happen sufficiently quickly, exacerbating the concentration effect. If the concentration of KOH drops to 0% anywhere in the anode, then the zinc in that area is liable to passivation, severely compromising performance.

In general, it appears that, below an anode porosity of about 70%, changes affecting the anode are significant, and it can be considered that the performance of the cell is anode limited. Above this range, it appears that cathode effects are more important. Without being bound by theory, it appears that the reason for a final KOH concentration of 50% being the most preferred is because KOH crystallises out in the cathode, rather than the anode and that, above 70% anode porosity, the cathode becomes determinative. Below 70% anode porosity, higher KOH serves to partially compensate for reduced porosity, thereby partially overriding the adverse effect on the cathode. This effect is still apparent above an anode porosity of 70%, but the effect on the cathode becomes more important, so that crystallisation of KOH in the cathode dictates the maximum final concentration of KOH.

Thus, there is further provided a cell as defined above and comprising electrolyte containing KOH, which, prior to discharge, has a KOH concentration selected such that, after the cell has been discharged to a depth of discharge of one electron, the calculated KOH concentration is about 50% w/w. Preferably, the amount of electrolyte is such that, at a calculated level of one electron discharge of the manganese dioxide, the calculated concentration of potassium hydroxide is between 49.5 and 51.5% (w/w solution).

Previously, it had not been possible to glean information, such as the impact of porosity changes, from data obtained from experimental cells, owing to the complications presented by the uncertainty of the relationship of each constituent to the other. In particular, the only previous certainty was that there should be sufficient water present, in the form of potassium hydroxide solution (referred to as "electrolyte" herein and in the industry) to enable the electrochemical reaction to take place. This is illustrated in US '139, where every attempt is made to maximise the quantity of "active" ingredients, without taking any particular note of the amount of electrolyte.

We now know that it is important that the final concentration of the KOH not exceed about 50% after one electron discharge, and that this rule applies, regardless of the extent to which the cell is intended for discharge, or the rate at which it is discharged. Deviation from this rule has very significant repercussions on cell performance, and distorts experimental results obtained from changing other parameters, to the extent that it is impossible to derive meaningful conclusions when it is not observed.

Recognising that the final concentration of KOH should be 50% after 1 electron discharge provides a firm rule for standardising electrochemical cells, so that it is now possible to establish relationships between all of the other ingredients of electrochemical cells. Values for the variables in the complex equation which makes up electrochemical cells can now be established, given that there is now available a fixed standard by which the remainder can be measured.

Previously, without the realisation that it was crucial that the end concentration of KOH be in the region of 50% to maximise the performance of any given cell, varying the porosity of either the cathode or the anode had the inevitable result of varying the final concentration of KOH, so that the final performance of the cell was not only related to the porosity chosen, but also to the final KOH concentration. Thus, the results were meaningless, and it was not possible to establish the ideal porosity of either the cathode or the anode.

However, provided that cells are manufactured which adhere to the principle that the final KOH concentration should be in the region of 50% after one electron discharge, then it is now possible to establish that, contrary to expectations, there is a readily attainable ideal of porosity for both cathode and anode. If the porosity of either is substantially below the ideal, then performance drops significantly while, if the porosity of either is substantially in excess of the ideal, then, once again, performance drops through lack of active material.

In general, it is preferred that the cells of the invention contain no added mercury and comprise an aqueous potassium hydroxide electrolyte, a zinc-containing anode and a manganese dioxide-containing cathode.

Although not essential to the invention, it is preferred that the concentration of potassium hydroxide in the electrolyte is between about 34 and 37% (w/w solution) prior to discharge. By "prior to discharge" we mean that the cell is in the condition intended for use by the user, after all manufacturing steps. Manufacturing may include a small amount of discharge, e.g., during electrical testing. However, what is generally considered to be more important is for the final concentration to be in the region of 50%, with the starting concentration being appropriately selected to achieve this end.

It will be appreciated that the amount of $MnO_2$ and zinc will generally be kept within a limited capacity ratio range, so that a change in one will result in a concomitant change in the other. The ratio may be any that a given manufacturer might want to employ, often in a range of about 1.2:1 to about 1.4:1 anode to cathode (A:C ratio). It is assumed herein that, when discussing varying parameters of either electrode, the overall ratio of anode capacity to cathode capacity is maintained.

Previously, reducing the amount of zinc meant either leaving the volumetric ratio of anode to cathode unchanged and increasing the porosity of the anode, or reducing the volume of the anode. In the former case, the cathodic capacity was necessarily left unenhanced while, in the latter case, the amount of electrolyte (a substantial part of the anode) was reduced too far, so that the cell's performance was adversely affected. This is because the anode is substantially more porous than the cathode, so that any reduction in the size of the anode reduces the amount of electrolyte available. As explained in more detail hereinunder, this is a major problem when final electrolyte levels are so low, after 1 electron discharge, as to raise KOH concentrations much above 50%. It is this understanding that has allowed this major step forward in battery technology.

By increasing the porosity both of the anode and of the cathode, it is now possible to reduce the size of the anode but to retain the overall volumetric capacity for electrolyte. Thus, by increasing the porosities of both electrodes, enough electrolyte can be incorporated into the cell, prior to use, to allow the KOH concentration not to exceed about 50% after the cell has been discharged to a level of 1 electron, as explained in more detail below.

The present invention, by reducing the A:C ratio, thereby reduces deep discharge leakage without reducing discharge duration on low drain intermittent discharge. Indeed, by reducing this ratio it is possible to increase continuous high drain constant current performance by increasing the amount of manganese dioxide present in the cathode.

A feature that is also of importance is anode efficiency. Despite the optimisations over the art featured in the present invention, anode efficiency rarely exceeds 26%. Accordingly, reducing the A:C ratio below about 1.15:1 reduces performance, as the expected improvement in anode efficiency is not seen, so that anode efficiency becomes the limiting factor on performance in such cells.

Anode efficiency appears to bear a close relationship to initial KOH concentration. In the present invention, the final KOH concentration needs to be about 50% after 1 electron discharge. However, the initial KOH concentration will vary in accordance with the capacity of the $MnO_2$ and the total amount of electrolyte. If there is a large amount of electrolyte, then initial KOH concentration will be higher, as depletion of water in the cell reaction has a smaller concentrating effect on KOH, but it is still necessary to finish at 50%.

The corollary is that smaller amounts of initial electrolyte require lower concentrations of KOH, as the dehydrating effect of the cell reaction is that much greater. For the same amount of water consumed, the KOH concentration rise is greater, so the initial concentration must be lower for the final concentration still to be 50%.

This affects anode efficiency, as the anode is more efficient at higher concentrations of KOH. As an empirical rule, we have established that, for an increase of about 1% initial KOH concentration, the efficiency of the anode increases by about 0.5%. As greater initial KOH concentration is dependent on the initial amount of electrolyte being higher, then it will be appreciated that anode efficiency decreases with decreasing anode size, as the anode is more porous than the cathode, so that reducing anode size necessarily reduces the initial amount of electrolyte. Thus, although the amount of cathode material can be increased, this is eventually balanced out by decreasing anode efficiency resulting from reducing the size of the anode.

The porosity of either electrode may be increased in any suitable manner. In the case of the anode, for example, this may be achieved by increasing the internal diameter of the cathode, thereby increasing the volume of the anode, while keeping the same amount of zinc. If the volume of the anode is not increased, then the amount of zinc and, concomitantly, the amount of cathode material, must be reduced in order to reduce the anode porosity, unless a deliberate decision is taken to vary the A:C ratio. It will be appreciated that it is an advantage of the present invention that the overall amount of active electrode material can be reduced while increasing cell performance.

The zinc used in the anode must be properly selected to maintain sufficient electrical conductivity within the anode. The zinc must include particles that have shapes and sizes that will do so even though the amount of zinc relative to the anode is relatively small. Zinc containing particles that are able to maintain the conductive matrix at lower concentrations has a relatively low tap density. Above a porosity of about 66%, the anode preferably comprises non-granular zinc. Such zinc may simply be any form with greater surface area than normal powdered zinc used in cells.

Preferably the overall tap density of the zinc used in cells made according to the present invention, with an anode porosity equal to or greater than 69%, is less than 3.2 g/cc. In general, as the anode porosity is increased, the tap density of the zinc must be reduced. For lower porosity anodes, the preferred maximum tap density is lower, by 0.06 g/cc for every 1% increase in anode porosity above 69%. It is more preferred that when the anode porosity is 69% the overall tap density of the zinc is no greater than 3.13 g/cc, and for lower porosity anodes the overall tap density is 0.085 g/cc lower for every 1% increase in anode porosity above 69%. When the anode porosity is about 71%, the preferred overall tap density of the zinc is from 2.83 to 2.96 g/cc, inclusive.

One way to control the overall tap density is to use a mixture of high and low density zincs. For example, conventional, irregularly shaped, high-density zinc powder may be blended with uniformly shaped, low-density zinc particles to obtain the desired overall tap density. Such mixtures may also have processing or cost advantages.

"Uniformly shaped zinc particles" means that the individual particles of zinc have substantially consistent morphology. This is in contrast with typical zinc powders with consistently irregular shapes, few of which are similar to each other. To have a uniform shape, each of the particles' shape factor must be substantially similar to all other particles. Therefore, for example, if the uniform shape is flakes, then all of the particles must be flakes. In order to produce uniformly shaped particles, control of the forming or classification process should be used to ensure the desired consistent particle shape. The shapes of zinc particles can be determined by examining the particles with a scanning electron microscope.

The overall tap density of the zinc is calculated from the measured tap densities of the different types of zinc contained in the anode. The overall tap density equals $100/\Sigma (d_n/w_n)$, where $d_n$ is the tap density of zinc type n and $w_n$ is the weight percent of zinc type n, based on the total amount of zinc particles in the anode. If a single zinc type is used, the overall tap density is equal to the measured tap density of a sample of that zinc.

Flake is a useful shape with a relatively low tap density, but other 2-dimensional and 3-dimensional shapes are also useful for reducing the overall tap density of the zinc in the anode. Such zinc overcomes the problem of loss of electrical path in the zinc with separation of the zinc particles at higher anode porosities. Zinc flake is a preferred form of uniformly shaped, low-density zinc and will generally be referred to herein, although it will be understood that reference to zinc flake, or flake, includes reference to other forms of low-density zinc, unless otherwise indicated or apparent.

On high drain constant current discharge, a zinc flake content of about 5% w/w total zinc is sufficient to compensate for loss of conduction path up to about 73% porosity. In general, a flake content of 1% w/w per 1% increase in porosity of the anode over 66% is sufficient, although it will be appreciated that the skilled person may employ as much flake as desired. Any reduction in zinc in the anode may be compensated by other anode ingredients, as appropriate. Surprisingly, about 5 to 7% zinc flake and an anode porosity of between 70 and 73% is particularly effective in high drain constant current situations, yielding several percent increases in performance.

For improved high drain constant power discharge, somewhat more flake is preferred. In general, a zinc flake content of about 1.5% w/w total zinc per 1% increase in porosity of the anode over 67% is sufficient, although it will be appreciated that the skilled person may employ as much flake as desired. More preferably, zinc flake content is about 2% w/w per 1% increase in porosity of the anode over 67%. Levels beyond this are acceptable, but generally yield little further improvement in performance, high levels of flake are more difficult to handle, and zinc flake is more expensive. More particularly, a level of about 8% to 11% flake, based on the total amount of zinc particles in the anode, has been found to be useful in combination with an anode porosity of about 71%, for example, a level of about 8% flake being both commercially and practically convenient.

For example, the zinc may be a mixture comprising at least 4%, by weight, uniformly shaped, low-density zinc particles having a tap density of less than 2.5 g/cc.

The cathode may be made porous in many ways. One method in the art employs CMD. Cells having cathodes containing CMD generally perform worse in high drain, continuous tests than cells containing only EMD. However, surprisingly, we have now found that, if CMD is used in the present invention, with a porous anode, then the drawbacks of CMD are ameliorated. While cells containing CMD do not perform quite as well as cells whose porosity is raised to the same level by another means, the difference is only small. What is particularly notable is the considerable extra strength imparted to the cathode, which is a substantial advantage in assembly.

Other methods may also be used to prepare porous cathodes. Preferred methods are those that will lead to a generally homogeneous texture. This can generally be achieved by reducing the amount of $MnO_2$ or carbon in the cathode mix. However, there can be a problem when $MnO_2$ is insufficiently compacted, in that the structural integrity of the cathode will tend to be compromised, unless otherwise compensated. Likewise, reduction in the amount of carbon can not only reduce structural integrity, but can also result in reduced conductivity.

Reducing the amount of $MnO_2$ reduces capacity and, if there is less material to form the cathode, then the density of the cathode must also be reduced. This can lead to manufacturing problems with pellets, for example, being more likely to crumble. This can be overcome in various ways, such as by using crushed ice or solid KOH during construction, or maximising $MnO_2$ and reducing the carbon content, such as by using carbon black. In all such cases, the cathode can still be compacted to the normal extent, but leaving the cathode more porous.

Where solid KOH is used, subsequent addition of water or KOH solution to yield desired electrolyte levels has, surprisingly, been found not to give rise to excessive heating, and has yielded strong pellets. Carbon black provides weak pellets but with good conductivity but, surprisingly, we have found that, if it is pre-mixed with between about 5 and 30% electrolyte, usefully about 10 to 15% electrolyte, then strong pellets can be formed. All of these methods are individually preferred, and each assists in providing sufficiently solid cathode material after compaction to be used in cell manufacture.

Carbon content is generally kept to a minimum so that, what is necessary is that the amount of $MnO_2$ be reduced relative to volume of cathode in order to provide higher porosity. In general, a $MnO_2$:C weight ratio of at least 20:1 is preferred. Higher ratios are possible, subject to considerations of electrical conductivity in the cathode.

Although the effect of increasing conductivity in the anode has been found to be of importance, we have also found that conductivity of the cathode has a significant effect on the performance of cells of the invention in wattage tests.

Conductivity of the cathode may be enhanced by appropriate selection of the carbon content. In the art, carbon content has generally been kept to a minimum so that, what is necessary is that the amount of $MnO_2$ be reduced as far as possible to reduce inactive content in the cathode, while maintaining a sufficient level of conductivity. This applies to other cell types but, in the present invention, it has been found that the $MnO_2$:C weight ratio is preferably no higher than about 26:1. A ratio of between 20:1 and 25:1 is more preferred, especially between 22:1 and 24:1, with about 23:1 being currently preferred when using Superior GA17 graphite and GHU EMD, for example. When using other carbon sources or graphites and/or other brands of $MnO_2$, these ratios may vary, and suitable ratios are readily determined by those skilled in the art.

The general, alkaline cell reaction scheme is as follows:

$$Zn + 2MnO_2 + H_2O \rightarrow ZnO + 2MnOOH \qquad (I)$$

Although the manganese compound is shown as $MnO_2$, as is conventional, it is well understood by those skilled in the art that manganese dioxide is non-stoichiometric, and the actual formula is approximately $MnO_{1.96}$. Accordingly, the actual number of electrons involved in this reaction is approximately 0.925. This is referred to herein, as is also conventional, as "1 electron", or 1 e.

The reaction shown in scheme (I) above, generally referred to as the "first electron reaction" is not necessarily the only reaction to occur, and it may be followed by a second electron reaction, in which the MnOOH is converted to $Mn(OH)_2$. This second reaction is usually only significant where cells are severely depleted. It appears to have very little, or no, effect on the requirement for a 50% final KOH concentration after 1 e discharge (first electron reaction), and cells optimised for 50% KOH after 1 e perform better, regardless of whether they proceed to the second electron reaction. Thus, herein, only the first electron reaction is taken into account. Any references herein to the "point of completion" mean the point at which the first electron reaction, or 0.925 electron in stoichiometric terms, has gone to completion (i.e., $Mn^{+3.925}$ is reduced to $Mn^{+3.0}$).

By way of illustration, on a discharge plot, the ampere hours are measured under the discharge line which, in the case of manganese dioxide, originally tends to form a very substantial shoulder and then plateau's off very sharply, after which point it is occasionally possible to observe removal of the second electron. One electron discharge corresponds to the juncture of the bottom of the shoulder and the beginning of the plateau. Although this plateau occurs at a voltage below that considered as failure for most cells, the drop to this point is generally steep, and the calculations of 1 electron for the purposes of the present invention are unaffected.

It can be seen from the above equation that there must be sufficient water present to allow the reaction to go sufficiently to completion to be considered full discharge. The above reaction scheme takes place in the presence of a strongly alkaline solution, a solution of potassium hydroxide being currently preferred by cell manufacturers.

From the above, it will be understood that the "final concentration" of KOH (i.e., at the end of the first electron discharge) is a calculated one. However, applying reaction scheme (I) above, the final whole cell concentration of KOH is readily calculable, provided that the initial concentration of KOH is known.

In practice, calculating the final KOH concentration, based on this principle, means that it is neither necessary to discharge a cell by 1 electron, nor to measure final KOH concentration, whether in the anode, cathode, or both.

Accordingly, preferred cells can be designed and manufactured with considerable ease, as starting amounts of active materials are readily assembled and adjusted to yield a suitable, final, calculated concentration of KOH at 1 electron discharge.

As noted above, the final concentration of potassium hydroxide (KOH) has a very substantial impact on the performance of the cell. It is particularly desirable that, at the point of completion, the concentration of KOH, as calculated for the whole cell, should not exceed a value of greater than about 51.5%. More preferably, this should be no greater than 51%, with about 50.6% being around the optimum value. Values of less than 50.6% are acceptable, including about 49.5%, but much less than this also reduces the possibility for enhancement, as discussed below.

As noted above, by "porosity" is meant the relative amount, v/v, of the electrode in question that is not taken up with solids. As the solids content, volumewise, is generally easier to calculate than the non-solids, and also because porosity includes any trapped air, for example, then the calculation to determine percent porosity is generally expressed as $$[(V_\Sigma - V_S)/V_\Sigma]*100$$

wherein $V_\Sigma$ is the measured total volume of the electrode and $V_S$ is the volume of the solid component.

The volume of the solid component is not, generally, measured directly, but calculated as the product of weight over density. For the purposes of porosity, it will be appreciated that a given solid substance is quite likely already to possess a certain degree of porosity, such as chemical manganese dioxide (CMD) which can have porosities in excess of 50%, for example.

Thus, in order to more reliably calculate electrode porosity, the theoretical porosity of the substance is used. This is calculated based on molecular structure and 3-D arrays, and takes no account of any porosity that might result from the method of manufacture. Accordingly, for these purposes, both EMD and CMD are considered to possess the same theoretical density. If the actual, apparent density of the substance were employed in the porosity calculations, then the resulting, calculated porosity of the electrode would take no account of porosity introduced with the solids, and would, at best, be misleading and, at worst, meaningless.

Theoretical densities assumed for the electrodes in the present invention are as follows:

Cathode

| Component | Theoretical Density | Wt per 100 g | Vol. per 100 g |
|---|---|---|---|
| EMD | 4.53 ($d_1$) | $w_1$ | $v_1 = w_1/4.53$ |
| CMD | 4.53 ($d_2$) | $w_2$ | $v_2 = w_2/4.53$ |
| Graphite | 2.25 ($d_3$) | $w_3$ | $v_3 = w_3/2.25$ |
| Coathylene ® | 0.92 ($d_4$) | $w_4$ | $v_4 = w_4/0.92$ |
| 40% KOH | 1.39 ($d_5$) | $w_5$ | $v_5 = w_5/1.39$ |
| Another components | $d_6$ etc. | $w_6$ etc. $\Sigma = 100$ | $v_6 = w_6/d_6$ etc. |

Coathylene® is polyethylene

Anode

| Component | Type | Theoretical Density | Wt per 100 g | Vol per 100 g |
|---|---|---|---|---|
| Zinc+ | Solid | 7.14 ($d_7$) | $w_7$ | $v_7 = w_7/7.14$ |
| Carbopol 940 | Liquid | 1.41 ($d_8$) | $w_8$ | $v_8 = w_8/1.41$ |
| Indium hydroxide | Solid | 4.60 ($d_9$) | $w_9$ | $v_9 = w_9/4.60$ |
| ZnO | Liquid | 5.61 ($d_{10}$) | $w_{10}$ | $v_{10} = w_{10}/5.61$ |
| 36% KOH | Liquid | 1.35 ($d_{11}$) | $w_{11}$ | $v_{11} = w_{11}/1.35$ |
| Component x | ? | $d_{12}$ | $w_{12}$ | $v_{12} = w_{12}/d_{12}$ etc. |

In which 'x', '?' and 'etc.' allow for any further component(s), which may be solid or liquid.

Accordingly, the theoretical volume of the cathode is the sum of all of the ingredients=$V_\Sigma = \Sigma(v_1:v_6) = (v_1+v_2+v_3+v_5+v_6$ etc.).

Likewise, the theoretical volume of the anode=

$$V_T = v_7 + v_8 + v_9 + v_{10} + v_{11}v^{12}.$$

In the case of the cathode, the theoretical volume is substantially the same as the actual volume, so that it is not necessary to build in any compensatory factors. However, should the actual cathode volume be different from that calculated, then it is the porosity of the actual cathode that prevails.

For the avoidance of doubt, the actual cathode volume can be calculated from knowing the height of the cathode (H), and the internal and external diameters of the cathode (ID and OD, respectively). In the present invention, it is preferred to manufacture the cell using a stack of cathode pellets, so that H=Height of stack of pellets In a specific example, which is for illustration only, cathode diameters are as follows:

|  | Pellet as manufactured | In can |
|---|---|---|
| Cathode OD | 1.345 = $OD_p$ | 1.335 = $OD_c$ |
| Cathode ID | 0.900 = $ID_p$ | 0.885 = $ID_c$ |

Thus, $$\text{Actual Volume} = V_A = H \cdot \pi \cdot \frac{(OD_c^2 - ID_c^2)}{4}$$

While, $$\text{Theoretical Volume} = V_A = H \cdot \pi \cdot \frac{(OD_p^2 - ID_p^2)}{4}$$

In the above case, whether the cathode pellet is as manufactured or "in can", the product of $OD^2 - ID^2$ is 0.999. This is because, in this instance, and as preferred in the present invention, the pellets are designed to be interference-fitting within the can, so that, on insertion, the pellets are compressed. Because this does not affect the volume then there must be a concomitant reduction in the internal diameter to compensate for the reduction in external diameter, in order that the volume remain unchanged.

In the cathode, the Theoretical Volume of Solids=$V_s$=$v_1$+$v_2$+$v_3$+$v_4$

Thus, $$\text{Cathode Porosity} = \frac{(V_A - V_S)}{V_A} \times 100$$

and this is the porosity to which the present invention pertains.

In the anode, $V_L$=Volume of Liquids=$v_8$+$v_{10}$+$v_{11}$
$V_S$=Volume of Solids=$v_7$+$v_9$ so that the $$\text{Theoretical Anode Porosity} = \frac{(V_T - V_S)}{V_T} \times 100 = \frac{V_L}{V_T} \times 100$$

and it is the theoretical porosity to which the anode paste is made up, and to which the present invention pertains.

In the case of the anode, there tends to be a substantial difference between the theoretical volume and the actual volume depending, to a certain extent, on the method used to fill the anode basket. In the embodiment under discussion, the basket comprises the separator fitted into the anode cavity in the cathode.

Methods used to fill the anode basket are generally one of two. The first is top filling, the second bottom filling. The former involves dropping in the anode paste generally from the vicinity of the top of the basket. The latter generally involves inserting a dispensing tube into the basket and injecting anode paste at a rate equivalent to withdrawal of the tube, withdrawal of the tube being generally effected or assisted by the force of the expulsion of the paste from the tube.

With top filling, more air tends to be trapped in the anode than with bottom filling. In any case, the trapped air, or anode deadspace, is usually at least 5% v/v and anywhere up to about 17%. Using bottom filling, the margins are between about 5% and 10% while, with top filling, the margins are between about 8% and 17%.

The porosity of the anodes of the present invention is not dependent on the anode deadspace, and a simple core of the anode will substantially yield the porosity to which the anode was made. Thus, the porosity of the present invention applies to the anode paste before being placed in the cell.

In a cell "off the shelf", there will be an anode deadspace as noted above, and generally in the region of about 10%. In order to establish the porosity of the anode, in accordance with the present invention, the most accurate method is to take a core sample, and perform the analysis described below. As a rougher guide, however, the anode deadspace found in most cells is about 10%. Variations from this amount provide porosities largely within experimental error, as an anode deadspace of about 10% gives an overall increase in anode porosity of about 3% compared with an anode deadspace of 0%. Thus, if an anode deadspace of about 10% is assumed, and standard bottom filling in a manufacturing facility yields about 9% anode deadspace, while standard top filling in such a facility yields an anode deadspace of about 12 or 13%, then it will be appreciated that, assuming a deadspace of about 10% will yield a porosity tolerance of ~1%.

In making up cells of the present invention, the theoretical volume of the components of the anode is first calculated, per 100 g of total components. The volume of the anode basket is then established, which will vary from the internal space defined by the cathode according to the volume of separator material used. This volume is then reduced by 10% to adjust for anode deadspace, and this is the volume of anode paste used.

Thus, if porosity is simply taken as a measure of the total solids in relation to the volume in the basket, then the resulting, apparent porosity of the anode, assuming 10% deadspace, will be about equal to [theoretical porosity/(100−10)]*100. In other words, apparent porosity≈theoretical porosity+~11%

As a rough guide, then, the actual porosity of the anode from a cell off the shelf will be equal to about the apparent porosity divided by 1.11. However, as noted, this will depend on the deadspace of the cell. As noted above, the porosity to which the present invention pertains is the porosity of the anode itself, and not the porosity of the anode+deadspace.

The anode fill volume, in the present example, despite being reduced by 10%, generally results in a fill of anode paste to generally the same height as the top of the cathode pellets. It will be appreciated that the amount of 10% may need to be modified according to anode fill techniques employed by those skilled in the art. In practice, the deadspace is filled with electrolyte, whether this enters after filling, or whether electrolyte is already present in the basket prior to filling, as part of the overall electrolyte needed in the cell of the invention. In any event, the anode deadspace is taken up with electrolyte, either straightaway, or after dispersion of the air.

In any event, the level of the anode paste should be about the same height as the cathode material. If the heights are different, especially if the anode is lower than the cathode, then high drain performance is adversely affected. Thus, a tolerance of no greater than 2.5% in height differential is envisaged, in relation to cathode height. If there is a differential, then it is preferred that the anode be higher than the cathode, but preferably only by a small margin, and preferably no more than 2.5%.

It will be appreciated that the amount of anode paste, after the 10% adjustment, will need to contain the appropriate amount of zinc to maintain the anode: cathode Ah ratio which, in the present example, is assumed to be 1.33. Where other ratios are applied, then suitable adjustments to volumes, for example, need to be made, but the principles of the invention remain unchanged.

In a cell "off the shelf", porosities may be determined readily. Essentially, it is necessary to first determine the volumes of the electrodes, then to establish their solids content. In the case of determining the KOH content, this can be established by assaying the various components of the cell and then combining the results.

The amount of water can be established by the use of a modified Dean & Stark method. Apparatus is available from Quickfit & Quartz Ltd., for example. The sample is covered with dry toluene and refluxed for 45 minutes, ensuring that a majority of the condensation takes place in the water-cooled condenser. Water is collected in a measuring cylinder or cuvette disposed under the condenser to catch the run-off. This method is modified by bubbling $CO_2$ gas through the boiling toluene, in order to convert KOH to $K_2CO_3$, otherwise not all water can be collected, as some stays behind with the KOH as water of crystallisation.

The amount of $OH^-$ is readily determined by soxhleting each component separately with water to obtain a solution containing KOH and water. All samples are combined, made up to a known volume, and then titrated for $OH^-$ by standard methods. For example, HCl of known molarity, together with phenolphthalein as an indicator, may be used. In this method, it is assumed that all $OH^-$ is KOH, and weights are calculated accordingly.

Together with the volume of water and the amount of $MnO_2$ (calculated as described below), it is then within the abilities of the skilled person to establish that a given cell satisfies the criteria of the present invention.

Returning to electrode porosities, and as noted above, these are calculated essentially as follows:

[(Total volume−Solids volume)/(Total volume)]*100

More specifically, the volumes of the electrodes may be determined in any suitable manner. It is preferred to establish the volume in situ, and this is preferably achieved by the use of X-rays, which give a clear indication of the internal proportions of the cell, especially anode and cathode height and width. This done, the cell can then be cut open, and the electrodes separated.

As a generality, for example, with the cells illustrated in the accompanying Examples, what we have found is that, in the anode, only the zinc needs to be considered while, in the cathode, only the manganese dioxide (EMD and CMD, where present) and carbon (usually graphite) need to be considered, when determining porosities. The remaining components are either present in vanishingly small quantities, are both not particularly dense and present in small quantities, or form part of the electrolyte, so that even if account is made for these components, the difference they make is lost in the margins of error.

Accordingly, in the anode:

Measure dimensions of internal volume of anode basket

Measure height of anode in basket from X-ray of cells

Remove all anode material and wash zinc with water to remove gellant and electrolyte Wash with ammonium hydroxide solution to leave just zinc Weigh zinc Volume of zinc=weight of zinc/7.14

Porosity=[(0.9*Volume basket−volume zinc)/(0.9*volume basket)]*100

It will be appreciated that the 0.9 accounts for the 10% deadspace. If necessary, the deadspace may be calculated by careful washing of the anode pellet to remove gel led electrolyte, and determining the remaining volume of the anode.

In the cathode:

Measure dimensions of cathode from X-ray and observation before removing cathode from can (Cathode OD, Cathode ID, Cathode Height determined)

Wash cathode with water to leave EMD/CMD, graphite and binder. Binder ignored as minor component and does not significantly affect cathode volume (less than error resulting from measurement)

Weigh solids

Dissolve $MnO_2$ out of solids by a mixture of 50% w/v aqueous HCl to leave graphite residue Weigh graphite $MnO_2$ weight=solids weight−graphite weight Volume of $MnO_2$=Weight of $MnO_2$/4.53

Volume of graphite=Weight of Graphite/2.25

Porosity of cathode=[(cathode vol.−$MnO_2$ vol.−Carbon vol.)/cathode vol.]*100

It will be appreciated that more sophisticated chemical or mechanical methods may be used, if desired, and are well within the ability of a person skilled in the art.

It will be apparent that the zinc component, for example, may comprise more than one component (powder and flake) as may the manganese dioxide (EMD and CMD), but this has no practical effect on determination of porosity.

It will also be appreciated that the density of the KOH solution, or electrolyte, will vary according to KOH content. However, KOH solution density is not important to the present invention. In general, densities of compounds can be found in the Handbook of Chemistry & Physics.

Cells of the present invention as illustrated herein are assumed to have a volume of 6.2 ml, and to be AA cells, unless otherwise stated. However, it will be appreciated that the present invention extends to all cells, including AAAA, AAA, AA, C, D and 9V, for example, as well as other cell types, and it will also be appreciated that suitable adjustments for capacity may need to be made. However, the principles of the present invention remain unaffected, regardless of cell type.

For example, the present invention may be applied in the same way, using the same ratios of cathode to anode volume, to other well known standard or non-standard cell sizes, such as AAAA whose available internal volume is approximately 1.35 ml, AAA whose available internal volume is approximately 2.65 ml, C whose available internal volume is approximately 20.4 ml and D whose available internal volume is approximately 43.7 ml.

Manganese dioxide of battery grade should be used in the present invention, and this may be from chemical, electrolytic or natural sources, with electrolytic most preferred, followed by chemical. Manganese dioxide exists in a number of different crystalline structures, commonly called, "α", "β", "γ", "δ" etc. We prefer to use the γ form, and any $MnO_2$ calculations herein are based upon the use of this form. Where manganese dioxide of another crystalline structure is used, the point of completion of the reaction may need to be calculated on the basis of different assumptions, in particular in relation to the meaning of "1 electron". In particular, the endpoint may be taken to be at the juncture between the main discharge curve and the plateau occurring at a voltage of less than 1.0. In the case of the γ form of $MnO_2$, this endpoint is calculated as being when all manganese is $Mn^{+3.0}$.

Where other materials or reactions (for example, co-cathodes) that consume water in the course of discharge are present in the cell, allowance should be made for the water consumed by these materials or reactions. Materials involved in the cell reactions that do not consume water may be disregarded for the purposes of these calculations.

Similar considerations also apply to the concentration of KOH at the beginning, before the cell has been discharged. Reaction Scheme I (supra) shows that the electrode reaction consumes one molecule of water for every two molecules of manganese dioxide consumed. However, a different reaction applies much below about 36% KOH.

Much below about 36% KOH, the reaction scheme changes to $$Zn + 2MnO_2 + 2H_2O \rightarrow Zn(OH)_2 + 2MnOOH \quad (II)$$

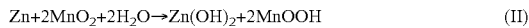

Thus, until the amount of KOH increases to about 36%, the reaction is inefficient, as more water than is necessary is being consumed, so that the point of completion of 50.6% is either reached too early, or more water than is necessary is present in the cell, thereby excluding other active ingredients. The former is generally more undesirable than the latter, as full discharge cannot be achieved.

Zinc oxide (ZnO) has previously been incorporated into the cell, either in the electrolyte, which is not especially efficient, or into the cathode, as it was found that the ZnO in the anode primarily served to plate the current collector, thereby protecting it. It has been conventional to add around 3% w/w zinc oxide to the whole cell. However, it is more efficient to add it to the anode only, in which case about 0.05% w/w in the anode achieves similar results.

When considering starting concentrations of KOH, it is generally assumed, herein, that cells start with 0% ZnO concentration in the cathode. However, it has been established that ZnO affects the starting concentration of KOH, insofar as a higher starting KOH concentration is needed to still reach a final concentration of about 50%. Accordingly, if 3% ZnO w/w whole cell (by incorporation with electrolyte) is used, then the starting KOH concentration is preferably about 37% solution, if it is 2% w/w, then between 36 and 37% w/w solution is preferred, and at 1%, 35–37% w/w solution is the preferred range.

As noted above, the concentration of KOH rises during the life time of the cell, with an effective cut-off at just over 50.6% KOH, after which the cell fails quickly. The more water there is in the cell, the higher the starting concentration of KOH there can be, assuming a point of completion of 50.6%. If the initial amount of water is reduced, then the concentration of KOH must also be reduced, if it is intended not to exceed the point of completion of 50.6%.

The calculation of final KOH will depend on the starting characteristics of the cell. When a cell is first constructed, the following are known:

| | |
|---|---|
| The weight of $MnO_2$ in the cell | $w_1$ |
| The initial weight of electrolyte in the cell | $w_2$ |
| The average initial KOH. concentration in the cell | $z_1\%$ |

The final KOH concentration (i.e., at the end of the 1 e discharge) is calculated based on the assumption that all of the $MnO_2$ is discharged to MnOOH. It does not matter whether this is true, as it has been found that the advantages of designing a cell to have a final KOH concentration of about 50% are still obtained, regardless of the final depth of discharge of the cell.

Which cell reaction applies is dependent on the average initial KOH:

$$2MnO_2 + 1H_2O + Zn = 2MnOOH + ZnO \quad (I)$$

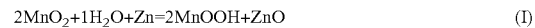

$$2MnO_2 + 2H_2O + Zn = 2MnOOH + Zn(OH)_2 \quad (II)$$

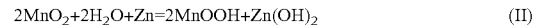

The calculations herein assume 100% Reaction (1) occurs when initial $OH^-$ is >8N and that 100% of Reaction (II) occurs when initial $OH^-$ is <6N. It will also be appreciated that the exact initial KOH concentration upon which the 8N and 6N calculations are based will depend on what else is dissolved in the KOH, such as ZnO or silicate, for example.

For example, everything else being equal, at 0.05% w/w ZnO in the anode, >8N $OH^-$ corresponds to >36% initial KOH, and <6N corresponds to <29%; at 3% ZnO dissolved in the KOH throughout the cell, then >8N $OH^-$ corresponds to >38% initial KOH, and <6N $OH^-$ corresponds to <31% initial KOH; while, if nothing else is dissolved in the electrolyte (only KOH), then >8N $OH^-$ corresponds to >34% initial KOH and <6N corresponds to <27% initial KOH.

It is assumed that for any pH between 6–8N $OH^-$ that the change from Reaction (I) to Reaction (II) occurs linearly.

Thus: Calculation of final KOH conc.

| 100% Reaction (I) | 0% Reaction (II) | >8N $OH^-$ |
|---|---|---|
| % of Reaction (I) = | a % = | 100% |
| % of Reaction (II) = | (100 − a)% = | 0% |
| 0% Reaction (I) | 100% Reaction (II) | <6N $OH^-$ |
| % of Reaction (I) = | a % = | 0% |
| % of Reaction (II) = | (100 − a)% = | 100% |
| 50% Reaction (I) | 50% Reaction (II) | 7N $OH^-$ |
| % of Reaction (I) = | a % = | 50% |
| % of Reaction (II) = | (100 − a)% = | 50% |

Wt. of H$_2$O consumed by Reaction (I)=[(No. of electrons)×(a/100)×(0.5×Mol. Wt Water)]/(Mol. Wt MnO$_2$)×$w_1$=$w_3$ Wt. of H$_2$O consumed by Reaction (II)=[(No. of electrons)×(100−a)/100]×[(1.0×Mol. Wt Water)/(Mol. Wt MnO$_2$)×$w_1$]=$w_4$ The above equations are empirical, but results generally accord with these equations.

| | | |
|---|---|---|
| No. of electrons = | 0.925 | |
| Mol. Wt of Water = | 18 | |
| Mol. Wt of MnO$_2$ = | 86.93 | |
| Final Wt of electrolyte = | $w_2$ − $w_3$ − $w_4$ = | $w_5$ |
| Wt. of KOH solid = | $z_1$/100 × $w_2$ = | $w_6$ |
| Final KOH concentration = | $w_6$/$w_5$ × 100 | |

What is surprising is that there is no need to take any account whatever of the 2$^{nd}$ electron reaction. This reaction generally takes place after the first electron reaction, and can yield extra power from the cell. However, for optimisation of the cell, it has now clearly been established that no account need be taken of the 2$^{nd}$ electron reaction.

It has been found that particularly useful separators for use in the present invention employ separators comprising a copolymer of:

(1) an ethylenically unsaturated carboxylic acid of formula (I):

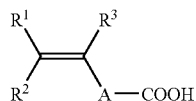

(I)

(where: R$^1$, R$^2$ and R$^3$ are the same as or different from each other and each represents a hydrogen atom, an alkyl group having from 1 to 10 carbon atoms or an aryl group; and A represents a direct bond or an alkylene group having up to 8 carbon atoms) or a salt or ester thereof; and (2) an aromatic compound of formula (II):

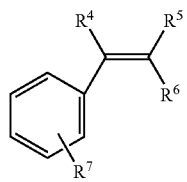

(II)

(where: R$^4$, R$^5$ and R$^6$ are the same as or different from each other and each represents a hydrogen atom, an alkyl group having from 1 to 10 carbon atoms or an aryl group; and R$^7$ represents a sulphonate or carboxylate group and balancing cation) or the separator comprises a homopolymer of said aromatic compound of formula (II). In general, it is preferred that A is a direct bond and R$^1$–R$^7$ are all hydrogen.

The copolymer may be used by itself as a separator, in which case it is preferably used to form the separator in situ in the cell, or it may be used as a coating on a porous substrate (for example traditional separator paper), in which case it can allow thinner paper and/or fewer layers to be used.

Particularly preferred copolymers are those comprising acrylic or methacrylic acid and a styrenesulphonate, and most preferred is a copolymer of acrylic acid and a styrenesulphonate, optionally with one or more other monomers, but preferably without. Most preferred is a copolymer of acrylic acid and sodium styrenesulphonate. Alternatively, a homopolymer of sodium styrenesulphonate may be used.

Where the copolymer or homopolymer alone is to be used as a separator, it is preferably sprayed as a solution or dispersion in situ in the cell. Thus, the cell is partially assembled, one of the anode and cathode being inserted into the cell housing. The solution or dispersion of the copolymer or homopolymer is applied, e.g. by spraying, onto that anode or cathode and allowed to dry, and then the other of the cathode and the anode is inserted into the cell, and the cell is completed.

Alternatively, and as used in the Examples herein, the copolymer or homopolymer is supported on a porous substrate of the type commonly used as a separator in electrochemical cell technology, also referred to herein as separator paper, although the substrate need not actually be paper. The copolymer or homopolymer may be applied as a coating to one or both sides, but preferably only one, for ease of application, or it may be soaked into the substrate. In either case, it is applied as a solution or dispersion and then dried (by removal of solvent, e.g. by evaporation), typically by steam drum drying, or coagulated as described above.

The apparatus used for coating may be any conventional coating apparatus, and many forms of such apparatus are available commercially. The apparatus used herein was a Dixon Pilot Coater, manufactured by T.H. Dixon & Co. Ltd., Letchworth, Herts, England, and this, or equivalent full scale apparatus, may be used in practising the present invention.

In particular, the advantage of this type of separator is that a single layer of separator paper, coated or impregnated with this copolymer or homopolymer, is the only separator that is required to form a useful cell resistant to shorts. The art uses double layers of separator which, especially in smaller cells, takes up valuable space which could otherwise be given over to active material.

Any suitable or conventional separator material may be employed in the present invention. Examples of suitable materials include the mixtures of polyvinyl alcohol (vinylon), and mercerised hardwood fibre sold as VLZ75 and VLZ105 (respectively about 75 and 105 µm thick) by Nippon Kodoshi Corporation (NKK), the similar material sold by Hollingsworth and Vose and the mixture of lyocell rayon fibre, polyvinyl alcohol fibre, matrix fibre and binder fibre sold by Freudenberg.

Accordingly, in a preferred embodiment, there is provided an electrochemical cell comprising a single layer of separator paper, coated and/or impregnated with a copolymer, or homopolymers, as defined above.

It will be appreciated that many factors must be taken into account when constructing an alkaline electrochemical cell. In the present invention, it is assumed that the cell generally conforms to the principles of cell manufacture, and it is envisaged that the cathode is of a solid nature, rather than semi-solid. Any standard ingredients may be used in cells of the present invention, including binders and anti-gassing agents, for example. The accompanying Examples were formulated without binders.

The invention is further illustrated by the following Examples. Unless otherwise indicated, the cells in the Examples were as follows: The initial concentration of KOH ranges between 36 and 42% but is selected so that the final concentration, after 1 e discharge, is 50.6%. Likewise, the Ah, and any reference to Ah (Ampere hours) herein, is calculated based on the assumption that 1 e reaction goes to completion (0.925 e) but that the second electron reaction does not take place, so that capacity is predicated on the first, and main, reaction only. Unless otherwise specified, Ah relates to the capacity of the cathode. The separator used was a layer of VLZ75 paper coated with a copolymer of acrylic acid and sodium styrenesulphonate in a ratio of 20:80 w/w at a rate of 30 gsm, or a double layer of VLZ105 paper. The $MnO_2$ used was GHU EMD and the graphite was Superior GA17.

In the Examples, some cells were subjected to the following tests, using a standard test machine Model No. BT2043 from Arbin Instruments, 3206 Longmire Drive, College Station, Tex. 77845, USA, and software MITS97, also from Arbin Instruments.

1 A/Cont./1 V0

In this test, the electrochemical cells were discharged at a constant current of 1 A continuously, until an endpoint voltage of 1 V was reached. The results are reported in minutes (m).

43 R0/4 h/1 d/0 V9

In this test, the electrochemical cells were discharged at a constant resistance of 43Ω for 4 hours per day with a rest period of 20 hours per day continuously, until an endpoint voltage of 0.9 V was reached. The results are reported in hours (h).

10 R0/1 h/1 d/0 V9

In this test, the electrochemical cells were discharged at a constant resistance of 10Ω for 1 hours per day with a rest period of 23 hours per day, until an endpoint voltage of 0.9 V was reached. The results are reported in hours (h).

3 R9/1 h/1 d/0 V8

In this test, the electrochemical cells were discharged at a constant resistance of 3.9Ω for 1 hours per day with a rest period of 23 hours per day, until an endpoint voltage of 0.8 V was reached. The results are reported in minutes (m).

1 W/Cont./1 V0

In this test, the electrochemical cells were discharged at a rate of 1.0 W continuously, until an endpoint voltage of 1.0 V was reached. The results are reported in minutes (m).

1 W/30 m/12 h/1 V0

The test cell is drained at a rate of 1.0 Watt for 30 minutes, then allowed to stand at idle for 11 hours and 30 minutes. This cycle is then repeated until the cell reaches the 1.0 V end-point.

1 W5/3 s/7 s/1 h/1 d/1 V0

The test cell is drained at a rate of 1.5 watts for 3 seconds then allowed to stand at idle for 7 seconds. This cycle is repeated continuously for 1 hour. The cell is then allowed to stand at idle for 23 hours. The whole cycle is then repeated until the cell reaches the 1.0 V end-point.

In the Examples below, LR6 (AA size cylindrical alkaline $Zn/MnO_2$) cells were made and tested to evaluate the effects of cathode and anode porosity, as well as other cell features. The cans used were steel, with a graphite coating on the inside surface to minimise internal resistance between the cathode and the can. The completed cells had a nominal internal volume of 6.33 $cm^3$, and the nominal volume of the ingredients (anode, cathode, and electrolyte) was 6.20 $cm^3$.

In general, the cells in Examples 1–4 were made according to the anode, cathode, and electrolyte formulations and other key cell features in Table 1, including calculated properties, unless otherwise indicated herein. In Table 1, percentages are weight percentages, except for porosity percentages, which are based on volumes.

TABLE 1

| Cathode Mix | | |
|---|---|---|
| EMD | % | 95.23 |
| Graphite | % | 3.17 |
| 40% KOH | % | 1.60 |
| Cathode Pellet | | |
| Weight | g | 2.69 |
| Height | cm | 1.080 |
| Cathode OD | cm | 1.345 |
| Cathode ID | cm | 0.900 |
| No. of pellets | | 4 |
| Cathode ID in can | cm | 0.885 |
| Separator | | |
| No. of Layers | | 1 |
| Type | | VLZ75/AA:SSA |
| Anode Paste | | |
| Zinc | % | 68.300 |
| Carbopol | % | 0.400 |
| In(OH)$_3$ | % | 0.015 |
| ZnO | % | 0.034 |
| Electrolyte | % | 31.250 |
| KOH Conc. | % | 38 |
| % of zinc as flake | % | 5 |
| Anode Paste Wt | g | 6.94 |
| Electrolyte Addition | | |
| Electrolyte Conc | % | 38 |
| Pre-Addition | g | 1.36 |
| Post-Addition | g | 0.36 |
| Calculated Items | | |
| Cathode Ah | Ah | 2.92 |
| Cathode Porosity | % | 28.8 |
| EMD:C ratio | | 30 |
| Anode Ah | Ah | 3.89 |
| Anode Porosity | % | 70.7 |
| Anode:Cathode Ah ratio | | 1.33 |
| Final KOH Conc. | % | 50–51 |
| Cathode Ah/Ingredients Vol ratio | | 0.471 |

EXAMPLE 1

Table 2 summarises key cell features as well as the discharge duration in minutes on the 1 A cont. test to 1.0 V (in column "1A").

TABLE 2

| Cathode | | | Initial | | | Anode | | | |
|---|---|---|---|---|---|---|---|---|---|
| Porosity (%) | Ah | EMD:C | ID (mm) | KOH (wt %) | Separator | Flake (wt %) | Porosity (%) | 1A | Cathode Eff % | Anode Eff % |
| >27 | 2.6–2.9 | | | | | | 70–76 | | | |
| 28.8 | 2.9 | 30 | 8.85 | 38 | 1 × VLZ/AA:SS | 3 | 70.7 | 56 | 32.0 | 24.0 |
| 31.3 | 2.8 | 26 | 8.85 | 40 | 1 × VLZ/AA:SS | 5 | 72.2 | 56 | 33.3 | 25.1 |

TABLE 2-continued

| Cathode | | | Initial | | | Anode | | | | |
|---|---|---|---|---|---|---|---|---|---|---|
| Porosity (%) | Ah | EMD:C | ID (mm) | KOH (wt %) | Separator | Flake (wt %) | Porosity (%) | 1A | Cathode Eff % | Anode Eff % |
| 31.3 | 2.7 | 23 | 9.05 | 40 | 2 × VLZ105 | 5 | 71.7 | 55 | 34.3 | 25.8 |
| 31.3 | 2.7 | 23 | 9.05 | 40 | 1 × VLZ/AA:SS | 8 | 74.3 | 54 | 33.7 | 25.3 |
| 33.8 | 2.7 | 23 | 8.85 | 40 | 2 × VLZ105 | 3 | 70.3 | 55 | 34.5 | 25.9 |
| 33.8 | 2.7 | 23 | 8.58 | 40 | 1 × VLZ/AA:SS | 7 | 73.4 | 56 | 35.1 | 26.4 |
| 33.8 | 2.6 | 23 | 9.05 | 41 | 2 × VLZ105 | 6 | 72.8 | 55 | 35.8 | 26.9 |
| 33.8 | 2.6 | 23 | 9.05 | 41 | 1 × VLZ/AA:SS | 10 | 75.5 | 54 | 35.2 | 26.4 |
| 36.3 | 2.7 | 20 | 8.58 | 40 | 1 × VLZ/AA:SS | 5 | 72.2 | 54 | 34.0 | 25.5 |
| >27 | 2.4–2.6 | | | | | | >76 | | | |
| 28.8 | 2.6 | 26 | 9.40 | 40 | 1 × VLZ/AA:SS | 12 | 76.7 | 51 | 32.7 | 24.6 |
| 31.3 | 2.5 | 26 | 9.40 | 41 | 1 × VLZ/AA:SS | 13 | 77.7 | 51 | 34.0 | 25.6 |
| 33.8 | 2.4 | 23 | 8.85 | 42 | 1 × VLZ/AA:SS | 15 | 78.8 | 50 | 34.7 | 26.1 |
| <27 | 2.6–2.9 | | | | | | 70–76 | | | |
| 25.8 | 2.9 | 30 | 9.05 | 40 | 1 × VLZ/AA:SS | 5 | 72.2 | 53 | 30.5 | 22.9 |
| 22.3 | 2.8 | 26 | 9.40 | 39 | 1 × VLZ/AA:SS | 10 | 75.3 | 49 | 29.2 | 21.9 |
| 25.8 | 2.8 | 20 | 9.05 | 39 | 1 × VLZ/AA:SS | 6 | 73.0 | 52 | 31.0 | 23.3 |
| 25.8 | 2.7 | 20 | 9.40 | 40 | 1 × VLZ/AA:SS | 13 | 77.2 | 52 | 32.1 | 24.1 |
| 26.9 | 2.8 | 26 | 9.16 | 40 | 1 × VLZ/AA:SS | 8 | 74.2 | 53 | 32.0 | 24.1 |
| >27 | 2.6–2.9 | | | | | | <70 | | | |
| 28.8 | 2.9 | 30 | 8.85 | 38 | 1 × VLZ/AA:SS | 0 | 70.7 | 53 | 30.3 | 22.7 |
| 33.8 | 2.8 | 23 | 8.85 | 40 | 2 × VLZ105 | 0 | 67.5 | 52 | 31.0 | 23.3 |
| 36.3 | 2.8 | 20 | 8.05 | 40 | 1 × VLZ/AA:SS | 0 | 65.9 | 52 | 31.0 | 23.3 |
| 36.3 | 2.8 | 26 | 8.85 | 40 | 2 × VLZ105 | 1 | 69.0 | 53 | 31.5 | 23.7 |
| >27 | >2.9 | | | | | | <70 | | | |
| 31.3 | 3.0 | 30 | 8.65 | 37 | 1 × VLZ/AA:SS | 1 | 69.1 | 54 | 30.0 | 22.6 |
| 33.5 | 3.1 | 20 | 8.05 | 36 | 2 × VLZ105 | 0 | 57.8 | 44 | 23.9 | 18.0 |
| <27 | >2.9 | | | | | | 70–76 | | | |
| 22.1 | 3.0 | 26 | 8.85 | 36 | 1 × VLZ/AA:SS | 4 | 71.1 | 50 | 27.8 | 20.9 |
| <27 | >2.9 | | | | | | <70 | | | |
| 26.9 | 3.1 | 26 | 8.65 | 36 | 2 × VLZ105 | 0 | 63.6 | 46 | 25.0 | 18.8 |
| 26.9 | 3.1 | 26 | 8.65 | 36 | 1 × VLZ/AA:SS | 0 | 67.4 | 51 | 27.7 | 20.8 |
| 28.8 | 3.1 | 30 | 8.65 | 36 | 1 × VLZ/AA:SS | 0 | 65.4 | 51 | 27.7 | 20.8 |
| 25.8 | 3.0 | 30 | 8.85 | 37 | 1 × VLZ/AA:SS | 2 | 69.5 | 53 | 29.4 | 22.1 |
| 22.1 | 3.0 | 26 | 8.85 | 36 | 2 × VLZ105 | 0 | 67.5 | 44 | 24.4 | 18.4 |

TABLE 2 is divided into seven regions:

| | Cath. Por. | Cath. Ah | Anode. Por. |
|---|---|---|---|
| Region 1 | >27% | 2.6–2.9 | 70–76% |
| One change from preferred range of the invention: | | | |
| Region 2 | >27% | 2.4–2.6 | >76% |
| Region 3 | <27% | 2.6–2.9 | 70–76% |
| Region 4 | >27% | 2.6–2.9 | <70% |
| At least 2 changes from preferred range of the invention: | | | |
| Region 5 | >27% | >2.9 | <70% |
| Region 6 | <27% | >2.9 | 70–76% |
| Region 7 | <27% | >2.9 | <70% |

The results in region 1 highlight the advantages of the present invention for cells intended for high drain applications. The cathode and anode porosities fall within the present invention. The results of the 1 Amp continuous test are excellent. These results are matched by high efficiency.

The results in region 2 demonstrate that, as the anode porosity gets higher, efficiency is maintained. However, the extra space required by the increasingly porous anode leads to a reduction in cathode capacity and a concomitant loss of performance. The 1 A results are at least 3 minutes less than for region 1.

The results in region 3 demonstrate that, when cathode porosity drops below 27%, there is a corresponding loss in cathode efficiency. The best results in this region can be seen to occur when other parameters are optimised, such as when cathode capacity is high, or when porosity approaches 27%.

The results in region 4 demonstrate similar findings for the anode as for the cathode. Thus, when the anode porosity is less than 70% there is a corresponding loss in anode efficiency and performance suffers.

In regions 5–7 of Table 2, the cell capacity is greater than 2.9 Ah. At this level, and for a total 6.2 ml ingredient volume, it becomes increasingly difficult to design a cell which satisfies the cathode and anode porosity requirements of the present invention. The cells in these regions suffer from both low cathode efficiency and low anode efficiency. Higher cathode capacity provides better performance to a certain extent, but cannot compensate for the reduction in porosity.

EXAMPLE 2

Table 3 to illustrates the effect of increasing the level of zinc flake. The data from the first region in Table 2 is repeated in the second region of Table 3 for ease of comparison.

TABLE 3

| Cathode Poros. (%) | Ah | EMD:C | ID | Initial KOH (wt %) | Separator | Flake (wt %) | Anode Porosity (%) | 1A | Cath Eff % | Anode Eff % |
|---|---|---|---|---|---|---|---|---|---|---|
| >27 | 2.6–2.9 | | | | | | 70–76 | | | |
| 28.8 | 2.9 | 30 | 8.85 | 38 | 1 × VLZ/AA:SS | 5 | 70.7 | 59 | 33.7% | 25.3% |
| 32.6 | 2.9 | 25 | 8.65 | 39 | 1 × VLZ/AA:SS | 5 | 70.7 | 59 | 34.4% | 25.9% |
| 33.8 | 2.8 | 23 | 8.58 | 39 | 1 × VLZ/AA:SS | 5 | 70.3 | 60 | 35.8% | 26.9% |
| 33.8 | 2.8 | 23 | 8.58 | 39 | 1 × VLZ/AA:SS | 8 | 70.3 | 59 | 35.2% | 26.5% |
| 36.3 | 2.7 | 20 | 8.58 | 40 | 1 × VLZ/AA:SS | 8 | 71.8 | 58 | 36.5% | 27.4% |
| >27 | 2.6–2.9 | | | | | | 70–76 | | | |
| 28.8 | 2.9 | 30 | 8.85 | 38 | 1 × VLZ/AA:SS | 3 | 70.7 | 56 | 32.0 | 24.0 |
| 31.3 | 2.8 | 26 | 8.85 | 40 | 1 × VLZ/AA:SS | 5 | 72.2 | 56 | 33.3 | 25.1 |
| 31.3 | 2.7 | 23 | 9.05 | 40 | 2 × VLZ105 | 5 | 71.7 | 55 | 34.3 | 25.8 |
| 31.3 | 2.7 | 23 | 9.05 | 40 | 1 × VLZ/AA:SS | 8 | 74.3 | 54 | 33.7 | 25.3 |
| 33.8 | 2.7 | 23 | 8.85 | 40 | 2 × VLZ105 | 3 | 70.3 | 55 | 34.5 | 25.9 |
| 33.8 | 2.7 | 23 | 8.58 | 40 | 1 × VLZ/AA:SS | 7 | 73.4 | 56 | 35.1 | 26.4 |
| 33.8 | 2.6 | 23 | 9.05 | 41 | 2 × VLZ105 | 6 | 72.8 | 55 | 35.8 | 26.9 |
| 33.8 | 2.6 | 23 | 9.05 | 41 | 1 × VLZ/AA:SS | 10 | 75.5 | 54 | 35.2 | 26.4 |
| 36.3 | 2.7 | 20 | 8.58 | 40 | 1 × VLZ/AA:SS | 5 | 72.2 | 54 | 34.0 | 25.5 |

Table 3 shows that increasing the flake level slightly serves to markedly improve anode efficiency and cell performance. However, increasing flake level above 5% does not enhance performance any further on the 1 A continuous discharge test.

EXAMPLE 3

Figure 2:
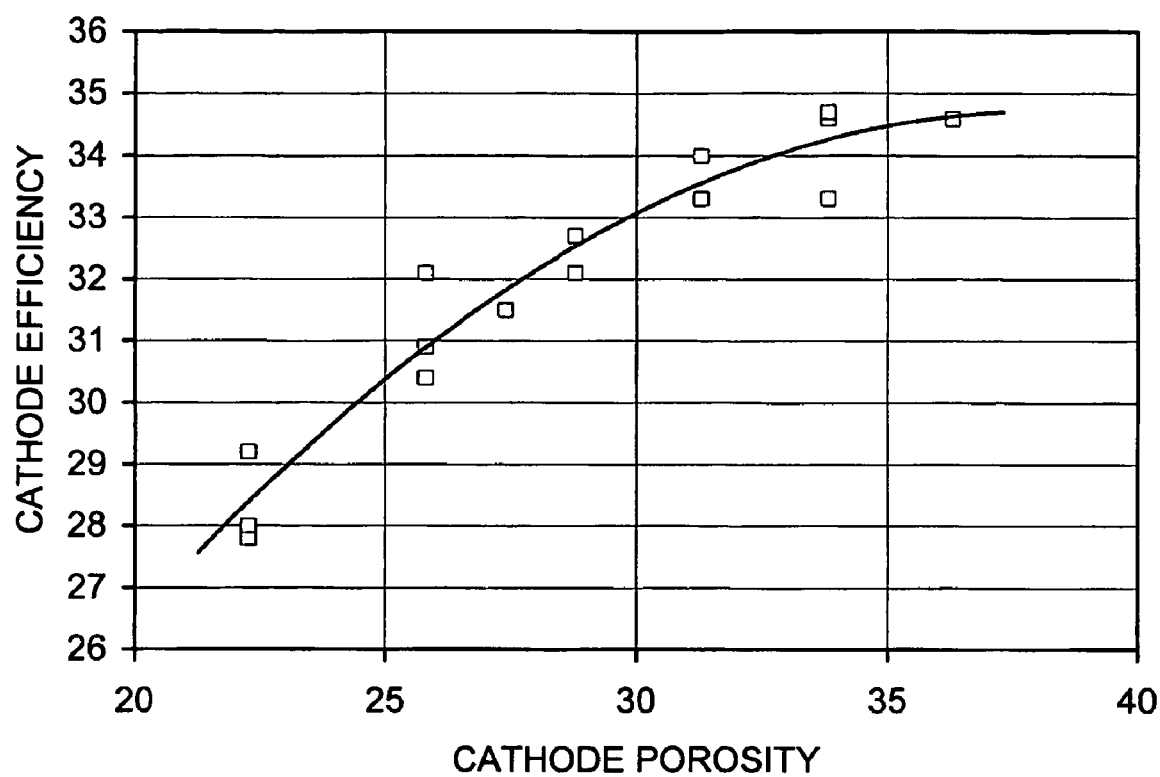
FIG. 2 is a graph showing cathode porosity vs. cathode efficiency for cells made according to an embodiment of the invention.

Accompanying FIG. 1 illustrates the effect of anode porosity on anode efficiency on 1 Amp continuous discharge to 1.0 V (cathode porosity above 28%), while FIG. 2 illustrates the effect of cathode porosity on cathode efficiency on 1 Amp continuous discharge to 1.0 V (anode porosity about 70–71%). It can clearly be seen that anode efficiency plateaus substantially at an anode porosity of around 71%. Cathode efficiency continues to rise above 28% but, as illustrated above, is counteracted by loss in capacity.

EXAMPLE 4

In Table 4 below, the effect of KOH concentration on performance and efficiency is shown.

TABLE 4

| Cathode | | | | A:C | KOH | | Anode | | 1A/Cont. 1V0 | | |
|---|---|---|---|---|---|---|---|---|---|---|---|
| Por. % | Cath. Ah | EMD:C Wt. Ratio | ID mm | Ah Ratio | Initial (wt %) | Final (wt %) | Flake (wt %) | Por. % | Perf. m | Cath Eff. % | Anode Eff. % |
| 25.8 | 3.3 | 20 | 8.20 | 1.33 | 34 | 61 | 0 | 60 | 42 | 21.2 | 15.9 |
| 25.8 | 3.3 | 20 | 8.20 | 1.33 | 36 | 55 | 0 | 60 | 45 | 22.7 | 17.1 |
| 25.8 | 3.3 | 20 | 8.20 | 1.33 | 38 | 57 | 0 | 60 | 49 | 24.7 | 18.6 |
| 25.8 | 3.3 | 20 | 8.20 | 1.33 | 40 | 60 | 0 | 60 | 50 | 25.3 | 19.0 |
| 25.8 | 3.0 | 20 | 8.65 | 1.33 | 34 | 54 | 2 | 68 | 42 | 23.3 | 17.5 |
| 25.8 | 3.0 | 20 | 8.65 | 1.33 | 36 | 50 | 2 | 68 | 45 | 25.0 | 18.8 |
| 25.8 | 3.0 | 20 | 8.65 | 1.33 | 38 | 52 | 2 | 68 | 49 | 27.2 | 20.5 |
| 25.8 | 3.0 | 20 | 8.65 | 1.33 | 40 | 55 | 2 | 68 | 50 | 28.3 | 21.3 |
| 25.8 | 2.8 | 20 | 9.05 | 1.33 | 34 | 50 | 7 | 73 | 46 | 27.3 | 20.6 |
| 25.8 | 2.8 | 20 | 9.05 | 1.33 | 36 | 48 | 7 | 73 | 49 | 29.2 | 21.9 |
| 25.8 | 2.8 | 20 | 9.05 | 1.33 | 38 | 50 | 7 | 73 | 52 | 30.9 | 23.3 |
| 25.8 | 2.8 | 20 | 9.05 | 1.33 | 39 | 51 | 7 | 73 | 52 | 30.9 | 23.3 |
| 25.8 | 2.8 | 20 | 9.05 | 1.33 | 40 | 52 | 7 | 73 | 49 | 29.2 | 21.9 |
| 25.8 | 2.7 | 20 | 9.40 | 1.33 | 34 | 47 | 13 | 77 | 47 | 29.0 | 21.8 |
| 25.8 | 2.7 | 20 | 9.40 | 1.33 | 36 | 46 | 13 | 77 | 50 | 30.9 | 23.2 |
| 25.8 | 2.7 | 20 | 9.40 | 1.33 | 38 | 48 | 13 | 77 | 51 | 31.5 | 23.7 |
| 25.8 | 2.7 | 20 | 9.40 | 1.33 | 40 | 50 | 13 | 77 | 52 | 32.1 | 24.1 |
| 28.8 | 2.92 | 30 | 8.85 | 1.33 | 36 | 48 | 5 | 71 | 56 | 32.2 | 24.2 |
| 28.8 | 2.92 | 30 | 8.85 | 1.33 | 38 | 50 | 5 | 71 | 60 | 34.5 | 25.9 |
| 33.8 | 2.79 | 23 | 8.65 | 1.33 | 36 | 47 | 5 | 71 | 58 | 34.6 | 26.0 |
| 33.8 | 2.79 | 23 | 8.65 | 1.33 | 39 | 50 | 5 | 71 | 61 | 36.4 | 27.3 |
| 36.6 | 2.64 | 20 | 8.65 | 1.33 | 36 | 45 | 7 | 72 | 55 | 34.7 | 26.1 |
| 36.6 | 2.64 | 20 | 8.65 | 1.33 | 40 | 51 | 7 | 72 | 58 | 36.6 | 27.5 |
| 33.8 | 2.92 | 30 | 8.85 | 1.33 | 38 | 50 | 3 | 71 | 56 | 31.9 | 24.0 |
| 33.8 | 2.79 | 23 | 8.65 | 1.33 | 39 | 50 | 3 | 71 | 56 | 33.5 | 25.2 |
| 36.6 | 2.64 | 20 | 8.65 | 1.33 | 41 | 51 | 5 | 72 | 54 | 34.1 | 25.6 |

In the above Table 4, it can clearly be seen that, below an anode porosity of 70%, higher KOH concentration increases efficiency and performance, but not to the same extent achievable with anode porosities of 70% and higher. At 70%, it is also clear that the optimum final KOH concentration is about 50%, whereas this is not the case for anode porosities much below about 70%.

EXAMPLES 5–7

LR6 cells similar to those in Examples 1–4 were used in Examples 5–7 below, except that they had the formulations and features shown in Table 5, unless otherwise indicated. Percentages are weight percentages, except for porosities, which are based on volumes. The Comparative cells of Example 5 were prepared in accordance with the teachings of International Publication No. WO 01/99214, except as shown in Table 5.

TABLE 5

|  |  | EXAMPLE 5 Comparative | EXAMPLE 6 | EXAMPLE 7 |
|---|---|---|---|---|
| Cathode Mix |  |  |  |  |
| EMD | % | 94.76 | 95.23 | 95.23 |
| Graphite | % | 3.64 | 3.17 | 3.17 |
| 40% KOH | % | 1.60 | 1.60 | 1.60 |
| Cathode Pellet |  |  |  |  |
| Weight | g | 2.84 | 2.69 | 2.83 |
| Height | cm | 1.080 | 1.080 | 1.080 |
| Cathode OD | cm | 1.345 | 1.345 | 1.345 |
| Cathode ID | cm | 0.900 | 0.900 | 0.873 |
| No. of pellets |  | 4 | 4 | 4 |
| Cathode ID in can | cm | 0.885 | 0.885 | 0.858 |
| Separator |  | 2*VLZ105 | VLZ75/AA:SS | VLZ75/AA:SS |
| Anode Paste |  |  |  |  |
| Zinc | % | 73.200 | 68.300 | 68.500 |
| Carbopol 940 | % | 0.340 | 0.400 | 0.390 |
| In(OH)$_3$ | % | 0.017 | 0.015 | 0.016 |
| ZnO | % | 0.036 | 0.034 | 0.034 |
| Electrolyte | % | 26.407 | 31.251 | 31.060 |
| KOH Conc. | % | 36 | 38 | 37 |
| % of zinc as flake | % | 0 | 5 | 5 |
| Anode Paste Wt | g | 6.80 | 6.94 | 6.51 |
| Electrolyte Addition |  |  |  |  |
| Electrolyte Conc. | % | 36 | 38 | 37 |
| Pre-Addition | g | 1.33 | 1.36 | 1.39 |
| Post-Addition | g | 0.35 | 0.36 | 0.32 |

TABLE 5-continued

|  |  | EXAMPLE 5 Comparative | EXAMPLE 6 | EXAMPLE 7 |
|---|---|---|---|---|
| Calculated Items |  |  |  |  |
| Cathode Ah | Ah | 3.07 | 2.92 | 3.07 |
| Cathode Porosity | % | 24.5 | 28.8 | 28.5 |
| EMD:C ratio |  | 26 | 30 | 30 |
| Anode Ah | Ah | 4.08 | 3.89 | 3.66 |
| Anode Porosity | % | 66.0 | 70.7 | 70.7 |
| A:C Ah ratio |  | 1.33 | 1.33 | 1.19 |
| Final KOH Conc. | % | 50–51 | 50–51 | 50–51 |
| Cathode Ah/Ingredients Vol |  | 0.495 | 0.471 | 0.495 |

Cells from Examples 5–7 were tested on four of the discharge tests described above. The results are summarised in Table 6.

TABLE 6

|  |  | EXAMPLE 5 Comparative | EXAMPLE 6 | EXAMPLE 7 |
|---|---|---|---|---|
| ANSI/IEC |  |  |  |  |
| 43R0/4h/0V9 | h | 95 | 91 | 95 |
| 10R0/1h/0V9 | h | 21.5 | 20.5 | 21.9 |
| 3R9/1h/0V8 | m | 486 | 474 | 506 |
| 1A/Cont |  |  |  |  |
| 1A/Cont./1V0 | m | 46 | 59 | 56 |

The first three tests in Table 6 are industry standard intermittent tests simulating fairly low drain devices. The cells in Example 5 performed well on these tests. The cells in Example 6 performed much better than those in Example 5 on the 1 A (continuous high drain) test, but a some discharge service is sacrificed on the lower rate tests. The cells in Example 7 not only provided excellent discharge performance on the 1 A continuous discharge test, but they also demonstrated discharge performance on the lower rate tests that is at least as good as that of the cells in Example 5.

EXAMPLE 8

LR6 cells similar to those in Example 7 further demonstrate the effect of A:C ratio on high rate discharge performance. Key cell parameters and the results of testing on the 1A continuous discharge test are summarised in Table 7. In all cells the final KOH concentration was 50–51%.

TABLE 7

| Cathode | | | | Initial | | Anode | | | Cath. | Anode |
|---|---|---|---|---|---|---|---|---|---|---|
| Porosity (%) | Ah | EMD:C | ID mm | A:C | KOH Conc. (wt %) | Flake (wt %) | Porosity (%) | Ah | 1A Eff. % | Eff. % |
| 28.6 | 3.07 | 30 | 8.58 | 1.19 | 37 | 5 | 70.7 | 3.65 | 56 | 30.4 | 25.5 |
| 26.5 | 3.07 | 20 | 8.58 | 1.19 | 37 | 5 | 70.7 | 3.65 | 53 | 28.8 | 24.2 |
| 26.5 | 3.07 | 26 | 8.58 | 1.17 | 37 | 5 | 70.7 | 3.59 | 54 | 29.3 | 25.1 |
| 26.5 | 3.07 | 30 | 8.75 | 1.24 | 37 | 5 | 70.7 | 3.81 | 57 | 30.9 | 25.0 |
| 26.5 | 3.07 | 30 | 8.75 | 1.19 | 37 | 7 | 70.7 | 3.65 | 53 | 28.8 | 24.2 |
| 28.6 | 3.07 | 30 | 8.58 | 1.19 | 37 | 0 | 70.7 | 3.65 | 50 | 27.1 | 22.8 |
| 27.7 | 3.07 | 25 | 8.58 | 1.19 | 37 | 0 | 70.7 | 3.65 | 50 | 27.1 | 22.8 |

TABLE 7-continued

| Cathode | | | | Initial | Anode | | | | Cath. | Anode |
| --- | --- | --- | --- | --- | --- | --- | --- | --- | --- | --- |
| Porosity (%) | Ah | EMD:C | ID mm | A:C | KOH Conc. (wt %) | Flake (wt %) | Porosity (%) | Ah | 1A | Eff. % | Eff. % |
| 26.5 | 3.07 | 20 | 8.58 | 1.19 | 37 | 0 | 70.7 | 3.65 | 50 | 27.1 | 22.8 |
| 26.5 | 3.07 | 26 | 8.58 | 1.17 | 37 | 2 | 70.7 | 3.59 | 51 | 27.7 | 23.7 |
| 30.6 | 3.20 | 25 | 8.58 | 1.00 | 36 | 5 | 70.7 |  | 48 | 25.0 | 25.0 |

The results in Table 7 show that the anode efficiency never exceeds 25.5% on the 1 A continuous discharge test. Cell discharge performance drops off with A:C below 1.15:1 because the anode is limiting at low A:C. The cells in Example 8 with A:C ratios from 1.15:1 to 1.25:1 provide substantially better 1A discharge performance compared to the Comparative cells of Example 5.

LR6 cells similar to those in Examples 1–8 were used in Examples 9–13, except that they had the formulations and features in Table 8, unless otherwise indicated. Percentages are weight percentages, except for porosities, which are based on volumes.

TABLE 8

Cathode Mix

| EMD | % | 94.30 |
| --- | --- | --- |
| Graphite | % | 4.10 |
| 40% KOH | % | 1.60 |

Cathode Pellet

| Weight | g | 2.70 |
| --- | --- | --- |
| Height | cm | 1.080 |
| Cathode OD | cm | 1.345 |
| Cathode ID | cm | 0.890 |
| No. of pellets |  | 4 |
| Cathode ID in can | cm | 0.885 |

Separator

| No. of Layers |  | 1 |
| --- | --- | --- |
| Type |  | VLZ75/AA:SSA |

Anode Paste

| Zinc | % | 68.00 |
| --- | --- | --- |
| Carbopol | % | 0.400 |
| In(OH)₃ | % | 0.015 |
| ZnO | % | 0.034 |
| Electrolyte | % | 31.55 |
| KOH Conc. | % | 38.5 |
| % of zinc as flake | % | 10 |

TABLE 8-continued

| Anode Paste Wt | g | 6.90 |
| --- | --- | --- |
| Electrolyte Addition |  |  |
| Electrolyte Conc | % | 38.5 |
| Pre-Addition | g | 1.49 |
| Post-Addition | g | 0.21 |
| Calculated Items |  |  |
| Cathode Ah | Ah | 2.90 |
| Cathode Porosity | % | 29.2 |
| EMD:C ratio |  | 23 |
| Anode Ah | Ah | 3.86 |
| Anode Porosity | % | 70.9 |
| Anode:Cathode Ah ratio |  | 1.33 |
| Final KOH Conc. | % | 50–51 |
| Cathode Ah/Ingredients Vol ratio |  | 0.468 |

EXAMPLE 9

The effects of zinc tap density and flake content were measured on cells which otherwise conformed with the present invention. The results are shown in Table 9, below. The overall tap density was calculated as described above. The tap density of each zinc type was measured using the following procedure, though any suitable method that would be recognised by the skilled person as producing the same results may be used:

Weigh an empty 5 ml graduated measuring cylinder

Add zinc to the measuring cylinder and reweigh

Tap the measuring cylinder with a rubber bung until the zinc settles to a stable level Read the volume of the zinc from the graduations on the measuring cylinder Determine the tap density of the zinc by dividing the net weight of the zinc in the measuring cylinder by the observed volume of the tapped zinc

TABLE 9

| Cathode Porosity | Cathode Ah | Anode Porosity | Flake Content (wt %) | Zn Tap Density g/cc | A:C ratio | 1A/Cont. 1V0 (min.) | 1W/Cont. 1V0 (min.) | Difference (min.) |
| --- | --- | --- | --- | --- | --- | --- | --- | --- |
| 28% | 3.1 | 71% | 0% | 3.40 | 1.19 | 51 | 55 | 4 |
| 28% | 3.1 | 71% | 5% | 3.11 | 1.19 | 56 | 61 | 5 |
| 28% | 3.1 | 71% | 8% | 2.96 | 1.19 | 55 | 62 | 7 |
| 28% | 3.1 | 71% | 11% | 2.83 | 1.19 | 54 | 63 | 9 |
| 29% | 2.9 | 71% | 0% | 3.40 | 1.33 | 53 | 57 | 4 |
| 29% | 2.9 | 71% | 3% | 3.22 | 1.33 | 56 | 62 | 6 |
| 29% | 2.9 | 71% | 5% | 3.11 | 1.33 | 59 | 66 | 7 |
| 29% | 2.9 | 71% | 8% | 2.96 | 1.33 | 58 | 66 | 8 |

It can be seen that, with decreasing overall zinc tap density, the performance in both the 1 Amp continuous and 1 Watt continuous tests improved. Reduced overall zinc tap densities were obtained by using a mixture of zinc powder and zinc flake. Zinc powder typically has a tap density of about 3.2 to 3.7 g/cc. The zinc powder used in this example was a barium-indium-aluminium alloy, supplied by Union Miniere of Brussels, Belgium, and had a tap density of 3.4 g/cc. The flake zinc was product number 5454.3 from Transmet Corp. of Columbus, Ohio, USA, and had a tap density of 1.2 g/cc. At an overall tap density of 3.11 g/cc, corresponding to a flake level of 5%, based on the total weight of zinc, performance in the 1 Amp continuous test peaks, while, in the 1 Watt continuous test, performance continues to improve above 5%, with no indication that there is a drop-off. In addition, those cells with higher cathode porosity also show higher results in both tests, thereby emphasising the importance of maximising cathode efficiency.

EXAMPLE 10

The effect of the EMD:C ratio was determined, using cells with >28% cathode porosity, 71% porosity anode paste containing zinc comprising 8 weight % flake, and having an A:C ratio of 1.33. The overall tap density of the zinc was 2.96 g/cc. The discharge test results are shown in Table 10, below.

TABLE 10

| Cathode (Ah) | EMD:C (wt. ratio) | 1A/Cont./1V0 (min.) | 1W/Cont./1V0 (min.) | Difference (min.) |
|---|---|---|---|---|
| 2.7 | 15:1 | 54 | 65 | 11 |
| 2.8 | 20:1 | 56 | 66 | 10 |
| 2.8 | 23:1 | 58 | 68 | 10 |
| 2.9 | 25:1 | 58 | 68 | 10 |
| 2.9 | 30:1 | 59 | 64 | 5 |

It can be seen from Table 10 that cell discharge capacity generally tends to increase with increasing EMD:C ratio. As the EMD:C ratio increases, the 1 A continuous performance increases, as expected, with increasing cathode capacity. However the 1 W continuous performance does not show the same relationship, with a peak performance at 23–25:1 EMD:C ratio. Thus, while 1 Amp continuous performance is primarily dependent on capacity, 1 Watt continuous performance shows some dependence on capacity, but conductivity of the cathode is an important factor.

EXAMPLE 11

The effect of varying various cell parameters is illustrated in Table 11, below. In each case, anode porosity was 71%.

TABLE 11

| Cathode Porosity (%) | Cathode Ah | EMD:C | A:C Ratio | Flake (wt %) | Zn Tap Density (g/cc) | 1W0/Cont. 1V0 (min.) |
|---|---|---|---|---|---|---|
| >30% | 2.7–2.9 | <26 | >1.25 | | | |
| 33 | 2.9 | 25 | 1.33 | 8 | 2.96 | 69 |
| 36 | 2.7 | 20 | 1.33 | 11 | 2.83 | 68 |
| 36 | 2.7 | 20 | 1.33 | 8 | 2.96 | 67 |
| 34 | 2.8 | 23 | 1.33 | 8 | 2.96 | 67 |
| <30% | 2.7–2.9 | <26 | >1.25 | | | |
| 29 | 2.9 | 20 | 1.33 | 8 | 2.96 | 66 |
| 29 | 2.9 | 23 | 1.33 | 8 | 2.96 | 64 |

TABLE 11-continued

| Cathode Porosity (%) | Cathode Ah | EMD:C | A:C Ratio | Flake (wt %) | Zn Tap Density (g/cc) | 1W0/Cont. 1V0 (min.) |
|---|---|---|---|---|---|---|
| 28 | 2.9 | 20 | 1.33 | 10 | 2.87 | 65 |
| 28 | 2.7 | 15 | 1.33 | 8 | 2.96 | 65 |
| >30% | <2.7 | <26 | >1.25 | | | |
| 34 | 2.6 | 23 | 1.33 | 8 | 2.96 | 62 |
| <30% | 2.7–2.9 | >26 | >1.25 | | | |
| 29 | 2.9 | 30 | 1.33 | 8 | 2.96 | 65 |
| >30% | >2.9 | <26 | <1.25 | | | |
| 30 | 3.0 | 25 | 1.22 | 8 | 2.96 | 64 |
| <30% | >2.9 | <26 | >1.25 | | | |
| 28 | 3.0 | 20 | 1.26 | 8 | 2.96 | 63 |
| <30% | >2.9 | <26 | >1.25 | | | |
| 29 | 3.0 | 23 | 1.24 | 8 | 2.96 | 60 |
| 28 | 3.1 | 25 | 1.19 | 11 | 2.83 | 64 |
| 28 | 3.1 | 25 | 1.19 | 8 | 2.96 | 62 |
| 28 | 3.0 | 20 | 1.22 | 8 | 2.96 | 62 |
| >30% | >2.9 | >26 | <1.25 | | | |
| 29 | 3.1 | 30 | 1.19 | 11 | 2.83 | 62 |
| <30% | >2.9 | >26 | <1.25 | | | |
| 28 | 3.1 | 30 | 1.18 | 8 | 2.96 | 61 |

The above Table 11 is divided into 9 regions, for ease of reference. Region 1 represents a generally preferred range in respect of cells intended for 1 Watt continuous use:

| | Cathode Porosity | Cath. Ah | EMD:C | A:C ratio |
|---|---|---|---|---|
| Region 1 | >30% | 2.7–2.9 | <26 | >1.25 |
| One change from Region 1: | | | | |
| Region 2 | <30% | 2.7–2.9 | <26 | >1.25 |
| Region 3 | >30% | <2.7 | <26 | >1.25 |
| 2 changes from Region 1: | | | | |
| Region 4 | <30% | 2.7–2.9 | >26 | >1.25 |
| Region 5 | >30% | >2.9 | <26 | <1.25 |
| Region 6 | <30% | >2.9 | <26 | >1.25 |
| At least 3 changes from Region 1: | | | | |
| Region 7 | <30% | >2.9 | <26 | <1.25 |
| Region 8 | >30% | >2.9 | >26 | <1.25 |
| Region 9 | <30% | >2.9 | >26 | <1.25 |

In the above Table 11, it can be seen that the best results for the continuous constant power drain test are achieved when a balance is struck among capacity, efficiency and conductivity. This is in contrast to cells intended for continuous constant current discharge, which require only a balance between capacity and efficiency. Where any one component is not optimal, it can be seen that a slight excess of another can compensate, such as where the cathode porosity is 33%. When it rises to 36%, efficiency improves at the expense of capacity, but can be partly compensated for by an increase in EMD:C ratio.

EXAMPLE 12

The effect of varying certain parameters was measured on cells having an anode porosity of 71%. The results are shown in Table 12, below.

TABLE 12

| Cathode Porosity (%) | Cathode Ah | EMD:C | A:C Ratio | Flake (wt %) | Zn Tap Density (g/cc) | 1W5/3s/7s 1h/1d/1V0 (min.) |
|---|---|---|---|---|---|---|
| >28% | >2.9 | <24 | >1.25 | | | |
| 29 | 2.9 | 23 | 1.33 | 8 | 2.96 | 43 |
| 29 | 2.9 | 20 | 1.33 | 10 | 2.87 | 43 |
| 28 | 2.9 | 20 | 1.33 | 10 | 2.87 | 43 |
| 28 | 3.0 | 20 | 1.26 | 8 | 2.96 | 43 |
| >28% | >2.9 | <24 | <1.25 | | | |
| 29 | 3.0 | 23 | 1.24 | 8 | 2.96 | 41 |
| 28 | 3.0 | 20 | 1.22 | 8 | 2.96 | 39 |
| 28 | 2.9 | 15 | 1.24 | 8 | 2.96 | 38 |
| >28% | >2.9 | >24 | >1.25 | | | |
| 28 | 3.0 | 25 | 1.26 | 8 | 2.96 | 37 |
| 29 | 2.9 | 30 | 1.33 | 9 | 2.92 | 34 |
| >28% | <2.9 | <24 | >1.25 | | | |
| 34 | 2.8 | 23 | 1.33 | 8 | 2.96 | 32 |
| >28% | >2.9 | >24 | <1.25 | | | |
| 30 | 3.0 | 25 | 1.22 | 8 | 2.96 | 37 |
| 28 | 3.1 | 25 | 1.19 | 9 | 2.92 | 34 |
| 28 | 3.1 | 30 | 1.18 | 8 | 2.96 | 36 |
| <28% | >2.9 | <24 | >1.25 | | | |
| 26 | 3.1 | 20 | 1.19 | 9 | 2.92 | 33 |

The above Table 12 is divided into seven regions. Region 1 is the generally preferred range for the test illustrated in Table 12.

| | Cathode Porosity | Cath. Ah | EMD:C | A:C ratio |
|---|---|---|---|---|
| Region 1 | >28% | >2.9 | <24 | >1.25 |
| One change from Region 1: | | | | |
| Region 2 | >28% | >2.9 | <24 | <1.25 |
| Region 3 | >28% | >2.9 | >24 | >1.25 |
| Region 4 | >28% | <2.9 | <24 | >1.25 |
| 2 changes from Region 1: | | | | |
| Region 5 | >28% | >2.9 | >24 | <1.25 |
| Region 6 | <28% | >2.9 | <24 | <1.25 |

The highest performance is obtained for the combination of >2.9 Cathode Ah, <24 EMD:C Ratio and >1.25 A:C ratio for 1 W5/3 s/7 s/1 h/1 d/1 V0 intermittent drain power test.

EXAMPLE 13

In this Example, data for 3 constant wattage tests are compared. In each case, anode porosity was 71%. The data for the three tests were summed and expressed as a percentage of the sum of the target results for cells with a cathode porosity of 28%, cathode capacity of 2.7 Ah, A:C ratio of 1.33, anode porosity of 69%, zinc tapped density of 3.40 g/cc, and no zinc flake. The results are shown in Table 13, below.

TABLE 13

| Cathode Porosity (%) | Cathode Ah | EMD:C | Cath. ID (mm) | A:C Ratio | Flake (wt %) | Zn Tap Density (g/cc) | 1W/Cont./ 1V0 (min.) | 1W0/30m/ 12h/1V0 (min.) | 1W5/3s/7s/ 1h/1d/1V0 (min.) | % of total Targets |
|---|---|---|---|---|---|---|---|---|---|---|
| | | | Target | | | | 37 | 37 | 18 | 100% |
| 28–30 | 2.9–3.0 | <24 | | >1.25 | | | | | | |
| 29 | 2.9 | 23 | 8:90 | 1.33 | 8 | 2.96 | 64 | 64 | 43 | 195% |
| 29 | 2.9 | 20 | 8.90 | 1.33 | 10 | 2.87 | 66 | 58 | 43 | 191% |
| 28 | 2.9 | 20 | 9.00 | 1.33 | 10 | 2.87 | 64 | 57 | 43 | 189% |
| 28 | 3.0 | 20 | 8.73 | 1.26 | 8 | 2.96 | 63 | 57 | 43 | 188% |
| 28–30 | 2.9–3.0 | <24 | | <1.25 | | | | | | |
| 29 | 3.0 | 23 | 8.73 | 1.24 | 8 | 2.96 | 60 | 57 | 41 | 181% |
| 28 | 3.0 | 20 | 8.73 | 1.22 | 8 | 2.96 | 61 | 57 | 39 | 179% |
| 28–30 | 2.9–3.0 | >24 | | >1.25 | | | | | | |
| 29 | 3.0 | 30 | 9.00 | 1.33 | 8 | 2.96 | 64 | 58 | 34 | 173% |
| 28–30 | 2.9–3.0 | >24 | | <1.25 | | | | | | |
| 29 | 3.0 | 25 | 8.73 | 1.22 | 8 | 2.96 | 65 | 57 | 39 | 182% |
| 30 | 3.0 | 25 | 8.73 | 1.23 | 8 | 2.96 | 63 | 60 | 37 | 179% |
| >30 | <2.9 | <24 | | >1.25 | | | | | | |
| 34 | 2.8 | 23 | 8.73 | 1.29 | 8 | 2.96 | 67 | 58 | 34 | 175% |
| 36 | 2.7 | 20 | 8.73 | 1.33 | 8 | 2.96 | 68 | 58 | 34 | 176% |
| 28–30 | >3.0 | >24 | | <1.25 | | | | | | |
| 29 | 3.1 | 30 | 8.73 | 1.18 | 8 | 2.96 | 61 | 57 | 36 | 174% |
| 28 | 3.1 | 25 | 8.73 | 1.19 | 8 | 2.96 | 63 | 57 | 34 | 171% |
| <28 | >3.0 | <24 | | <1.25 | | | | | | |
| 26 | 3.1 | 20 | 8.73 | 1.19 | 9 | 2.92 | 61 | 57 | 33 | 171% |

Table 13 is divided into 7 regions. Region 1 is the generally preferred range for cells optimised for all three of the tests:

| | Cathode Porosity | Cath. Ah | EMD:C | A:C ratio |
|---|---|---|---|---|
| Region 1 | 28–30% | 2.9–3.0 | <24 | >1.25 |
| One change from Region 1: | | | | |
| Region 2 | 28–30% | 2.9–3.0 | <24 | <1.25 |
| Region 3 | 28–30% | 2.9–3.0 | >24 | >1.25 |
| 2 changes from Region 1: | | | | |
| Region 4 | 28–30% | 2.9–3.0 | <24 | <1.25 |
| Region 5 | >30% | <2.9 | <24 | >1.25 |

-continued

| | Cathode Porosity | Cath. Ah | EMD:C | A:C ratio |
|---|---|---|---|---|
| At least 3 changes from Region 1: | | | | |
| Region 6 | 28–30% | >3.0 | <24 | <1.25 |
| Region 7 | <28% | >3.0 | <24 | <1.25 |

Although it can be seen that individual high results can be achieved with higher cathode porosities, overall a cathode porosity in the region of 28–30% in combination with an EMD:C ratio of below 24%, an overall zinc tap density of 2.96 g/cc, and a flake content of about 8%, based on the total weight of zinc, provides a cell which performs excellently in all three constant power tests in Example 13.

EXAMPLE 14

Figure 3:
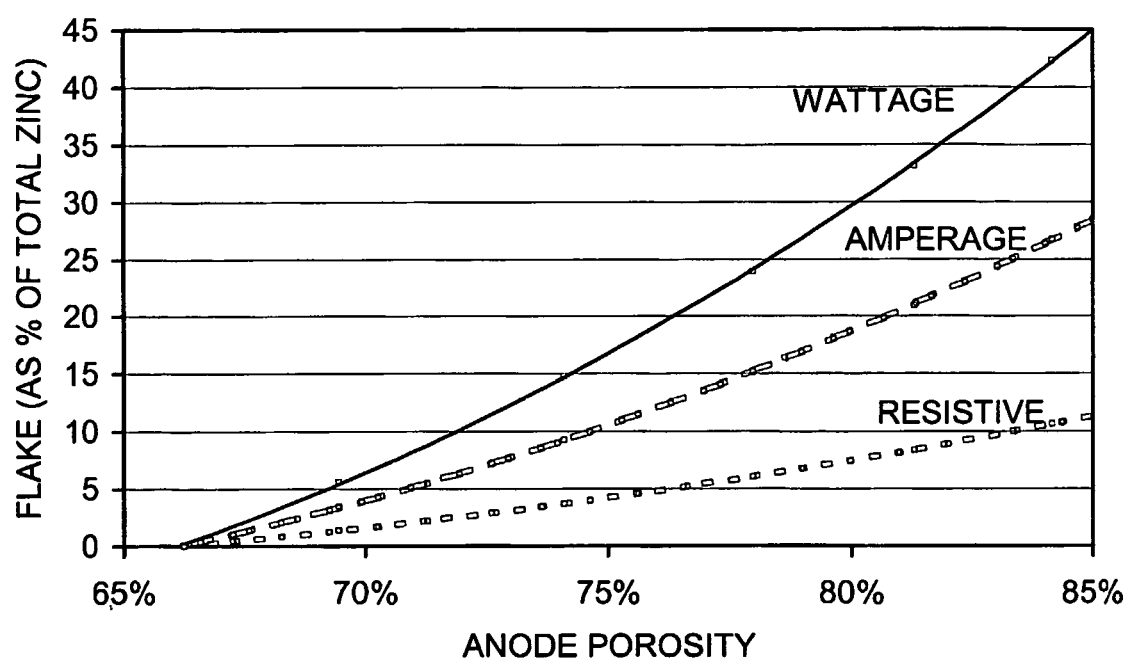
FIG. 3 is a graph showing anode porosity vs. the amount of zinc flake for cells made according to an embodiment of the invention.

In accompanying FIG. 3, there is demonstrated the approximate effect of zinc flake, according to the intended use of the cell. In this graph, the required weight percent zinc as flake for maximum discharge performance is shown as a function of the anode porosity for three different modes of discharge [constant resistance (resistive), constant current (amperage), and constant power (wattage)]. For example, at a level of 71% anode porosity, if the cell is intended for use in applications represented by the industry standard (ANSI/IEC) constant resistance type discharge tests, then only very low levels of flake are of any benefit, typically no more than 1 to 2%. Where the cell is intended for use in constant current drain situations, an optimum flake level is about 4 weight % of zinc. This corresponds to an overall zinc tap density of 3.1 g/cc. However, where the cell is intended for use in constant power requirement scenarios, a flake level of about 8% (overall zinc tap density of about 2.96) is optimum.

Interestingly, whatever the final intended use, the graph in FIG. 3 clearly demonstrates that there is no advantage to adding flake, unless the anode porosity exceeds 67%, or thereabouts.

Figure 4:
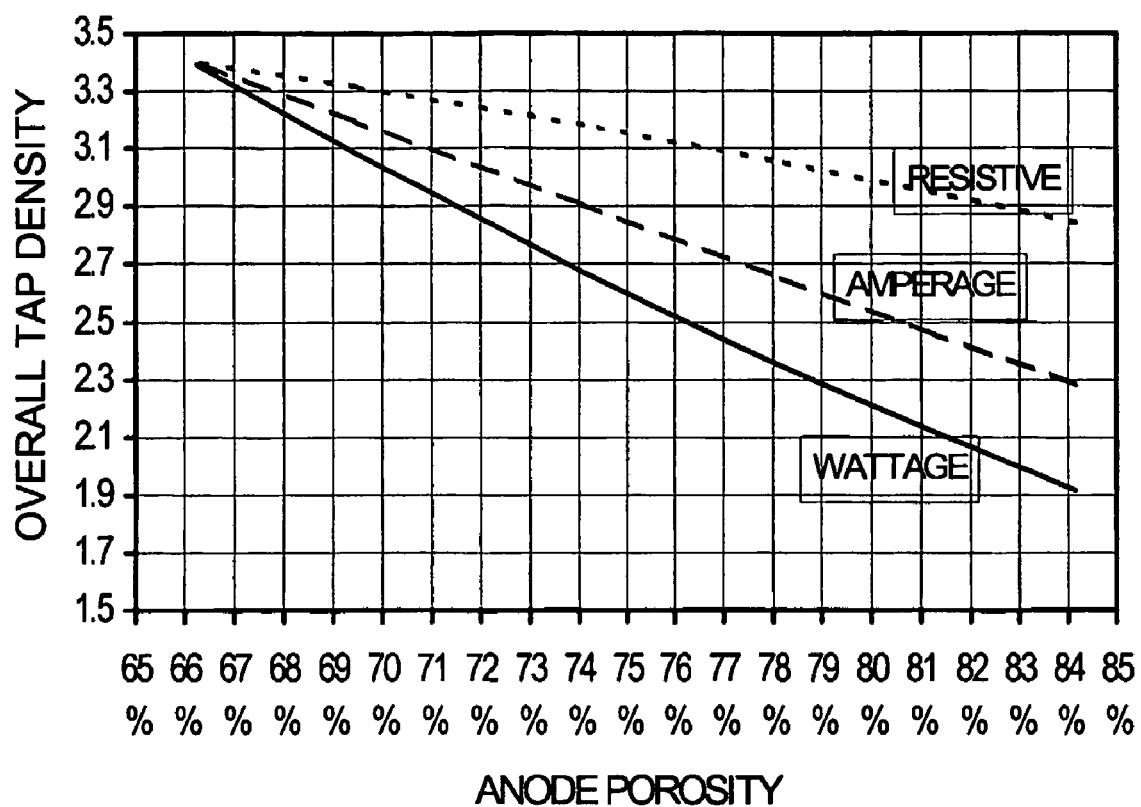
FIG. 4 is a graph showing the maximum overall zinc tap density as a function of anode porosity for cells made according to an embodiment of the invention.

Similarly, the graph in FIG. 4 shows the relationship between overall zinc tap density and anode porosity. At 71% anode porosity the overall zinc tap density can be as high as almost 3.3 g/cc without sacrificing performance on constant resistance tests, whereas, on constant current discharge the best performance is with a tap density of no more than about 3.1 g/cc, and on constant power discharge the maximum overall tap density of the zinc is about 2.96 g/cc.

The invention claimed is:

1. An electrochemical cell comprising an aqueous alkaline electrolyte, a porous cathode, and a porous anode, wherein the cathode comprises manganese dioxide, the cathode porosity is equal to or greater than 26% and not greater than 36%, the anode comprises an electrochemically active material insoluble in the electrolyte, the anode porosity is equal to or greater than 69% and not greater than 76%, and the electrolyte comprises KOH in a concentration prior to discharge selected such that, after the cell has been discharged to reduce the manganese in the manganese dioxide to $Mn^{+3.0}$, the calculated KOH concentration is about 50% w/w.

2. A cell according to claim 1, wherein the cathode porosity is at least 27%.

3. A cell according to claim 2, wherein the cathode porosity is at least 28%.

4. A cell according to claim 1, wherein the cathode porosity is no greater than 34%.

5. A cell according to claim 1, wherein the anode porosity is at least 70%.

6. A cell according to claim 1, wherein the anode comprises zinc, and the zinc consists of zinc having a calculated overall tap density of less than 3.2 g/cc.

7. A cell according to claim 6, wherein the maximum calculated overall tap density of the zinc is 3.19 g/cc when the anode porosity is 69% and 0.06 g/cc lower for every 1% increase in anode porosity over 69%.

8. A cell according to claim 6, wherein the maximum calculated overall tap density of the zinc is 3.13 g/cc when the anode porosity is 69% and 0.085 g/cc lower for every 1% increase in anode porosity over 69%.

9. An electrochemical cell comprising an aqueous alkaline electrolyte, a porous cathode, and a porous anode, wherein the cathode comprises manganese dioxide, the cathode porosity is equal to or greater than 26% and not greater than 36%, the anode comprises an electrochemically active material insoluble in the electrolyte, the anode porosity is equal to or greater than 69% and not greater than 76%, the anode comprises zinc consisting of zinc having an overall tap density of from 2.83 to 2.96 g/cc, inclusive, and the anode porosity is about 71%.

10. A cell according to claims 6, wherein the zinc comprises at least 4% by weight uniformly shaped, low-density zinc particles having a tap density less than 2.5 g/cc.

11. A cell according to claim 10, wherein the uniformly shaped, low density zinc is zinc flake and the flake thickness dimension is at least 10 times smaller than the flake length and width dimensions.

12. A cell according to claim 11, wherein the zinc has a zinc flake content of at least 1% w/w per 1% increase in porosity of the anode over 66%.

13. A cell according to claim 11, wherein the uniformly shaped, low-density zinc forms at least 1.5% w/w per 1% porosity of the anode over 67%.

14. A cell according to claim 11, wherein the uniformly shaped, low-density zinc forms at least 2% w/w per 1% porosity of the anode over 67%.

15. A cell according to claim 5, wherein the anode comprises zinc, and the zinc has a zinc flake content of about 5 to 11 weight percent and the anode has a porosity of between 70 and 73%.

16. A cell according to claim 15, wherein about 8% to 11% by weight of the zinc is zinc flake.

17. A cell according to claim 1, wherein the ratio of the capacity of the anode to that of the cathode is between 1.15:1 and 1.25:1.

18. A cell according to claim 1, wherein the cathode further comprises carbon and a manganese dioxide to carbon ratio is no higher than about 26:1.

19. A cell according to claim 18, wherein the manganese dioxide to carbon ratio is between 20:1 and 25:1.

20. A cell according to claim 19, wherein the manganese dioxide to carbon ratio is between 22:1 and 24:1.

21. A cell according to claim 19, wherein the cathode porosity is 28 to 30%, inclusive, and the manganese dioxide to carbon ratio is between 20:1 and 23:1.

22. A cell according to claim 19, wherein the cathode porosity is in excess of 30%.

23. A cell according to claim 1, wherein the ratio cathode capacity: cell volume is in the range of 0.42 to 0.49 $Ah/cm^3$, when the cathode capacity is calculated based upon reduction of all manganese in the manganese dioxide to $Mn^{+3.0}$.

24. An electrochemical cell comprising an aqueous alkaline electrolyte, a porous cathode, and a porous anode, wherein the cathode comprises manganese dioxide, the cathode porosity is equal to or treater than 26% and not greater than 36%, the anode comprises an electrochemically active material insoluble in the electrolyte, the anode porosity is equal to or greater than 69% and not greater than 76%, the electrolyte comprises KOH in a concentration prior to discharge selected such that, after the cell has been discharged to reduce the manganese in the manganese dioxide to $Mn^{+3.0}$ the calculated KOH concentration is about 50% w/w, and the calculated final concentration of potassium hydroxide after reduction of the manganese in the manganese dioxide to $Mn^{+3.0}$ is between 49.5 and 51.5% (w/w solution).

* * * * *